US012444336B2

(12) United States Patent
Hashikaki

(10) Patent No.: US 12,444,336 B2
(45) Date of Patent: Oct. 14, 2025

(54) DISPLAY DEVICE AND ELECTRONIC APPARATUS

(71) Applicant: Sony Semiconductor Solutions Corporation, Kanagawa (JP)

(72) Inventor: Kouichi Hashikaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/686,747

(22) PCT Filed: Sep. 6, 2022

(86) PCT No.: PCT/JP2022/033428

§ 371 (c)(1),
(2) Date: Feb. 26, 2024

(87) PCT Pub. No.: WO2023/062976

PCT Pub. Date: Apr. 20, 2023

(65) Prior Publication Data

US 2025/0140151 A1 May 1, 2025

(30) Foreign Application Priority Data

Oct. 14, 2021 (JP) ................................ 2021-169143

(51) Int. Cl.
*G09G 3/20* (2006.01)

(52) U.S. Cl.
CPC ... *G09G 3/2003* (2013.01); *G09G 2300/0452* (2013.01); *G09G 2340/0435* (2013.01)

(58) Field of Classification Search
None
See application file for complete search history.

(56) References Cited

U.S. PATENT DOCUMENTS

| | | | | | |
|---|---|---|---|---|---|
| 6,097,362 | A * | 8/2000 | Kim | G09G 3/3688 345/98 |
| 2011/0032235 | A1* | 2/2011 | Nose | G09G 3/3611 345/211 |

(Continued)

FOREIGN PATENT DOCUMENTS

| | | | |
|---|---|---|---|
| CN | 110221432 | A | 9/2019 |
| JP | H11175042 | A | 7/1999 |

(Continued)

OTHER PUBLICATIONS

International Search Report (PCT/ISA/210), International Application No. PCT/JP2022/033428, dated Nov. 22, 2022.

*Primary Examiner* — Kenneth Bukowski
(74) *Attorney, Agent, or Firm* — Michael Best & Friedrich LLP

(57) ABSTRACT

Display devices that accommodate increased frame rate without an increase in data transfer amount are disclosed. In one example, a display device includes pixels, control lines and data lines. The pixels are arranged in a two-dimensional array. The control lines extend in a first direction, and the data lines extend in a second direction. A pixel includes first through third subpixels that respectively emit first through third colors. Each subpixel includes a light emitting element, a capacitor, a write transistor, and a drive transistor. A control unit supplies the same image signal to two of the data lines corresponding to two of the first subpixels provided in two adjacent pixels.

17 Claims, 32 Drawing Sheets

(56) References Cited

U.S. PATENT DOCUMENTS

| | | | | |
|---|---|---|---|---|
| 2013/0169619 | A1* | 7/2013 | Jeong | G09G 5/001 345/212 |
| 2014/0160186 | A1* | 6/2014 | Oh | G09G 3/3648 345/694 |
| 2017/0236466 | A1* | 8/2017 | Spitzer | G09G 3/3266 345/560 |
| 2018/0083078 | A1* | 3/2018 | Park | H10K 10/82 |
| 2018/0309944 | A1* | 10/2018 | Lee | H04N 25/62 |
| 2019/0005884 | A1* | 1/2019 | Yoo | G09G 3/3266 |
| 2019/0036067 | A1* | 1/2019 | Kim | H05K 5/0017 |
| 2019/0172399 | A1* | 6/2019 | Chen | G09G 3/3266 |
| 2019/0228713 | A1* | 7/2019 | Tamura | G09G 3/3225 |
| 2022/0155595 | A1* | 5/2022 | Wang | G02B 27/0172 |

FOREIGN PATENT DOCUMENTS

| | | | |
|---|---|---|---|
| JP | 2007333997 | A | 12/2007 |
| JP | 2011039256 | A | 2/2011 |
| JP | 2019012258 | A | 1/2019 |
| JP | 2019507380 | A | 3/2019 |
| JP | 2019128468 | A | 8/2019 |
| WO | 2021124785 | A1 | 6/2021 |

* cited by examiner

FIG. 19

| | | | | |
|---|---|---|---|---|
| P0 | P02 | P2 | P24 | . . . |
| P05 | P0257 | P27 | P2479 | . . . |
| P5a | P57ac | P7c | P79ce | . . . |
| Paf | Pacfh | Pch | Pcehj | . . . |
| ⋮ | ⋮ | ⋮ | ⋮ | |

DISPLAY DEVICE AND ELECTRONIC APPARATUS

TECHNICAL FIELD

The present disclosure relates to a display device and an electronic apparatus.

BACKGROUND ART

In a display device for displaying a moving image, it is desired to increase the frame rate while maintaining image reproduction accuracy. In recent years, in a device for displaying augmented reality (AR) and virtual reality (VR), it is necessary to process video information for both eyes in parallel, and therefore, it is desired to further increase the frame rate while maintaining a certain degree of image reconstruction accuracy. In particular, since the frame rate is limited by the data transfer rate, the frame rate might be determined depending on how to reduce the data transfer.

As such a technique for increasing the frame rate while reducing data transfer, there is a technique for increasing the frame rate in a pseudo manner by scanning pixel values every two lines. For example, in a case where scanning is performed for each line with n as an integer, there are doubler drive in which the same pixel value is displayed for the 2nth and 2n+1th lines in each subframe to increase the frame rate in a pseudo manner, binning drive in which the same pixel value is displayed for the combination of the 2nth and 2n+1th lines and the combination of the 2n−1th and 2nth lines in each subframe to increase the frame rate in a pseudo manner, and the like.

As described above, when the frame rate is increased, the amounts of data transfer on both the data transfer side and the data reception and display side become larger. To cope with various new devices and technologies such as AR, it is desired to reproduce an image with a higher frame rate without an increase in the data transfer amount.

CITATION LIST

Patent Document

Patent Document 1: Japanese Patent Application Laid-Open No. 2011-039256

SUMMARY OF THE INVENTION

Problems to be Solved by the Invention

In view of the above, the present disclosure provides a display device that increase the frame rate without an increase in the data transfer amount.

Solutions to Problems

According to an embodiment, a display device includes a plurality of pixels, a plurality of control lines, a plurality of data lines, a first control unit, and a second control unit. The plurality of pixels is arranged in a two-dimensional array in a first direction and a second direction intersecting the first direction.

The plurality of control lines extends in the first direction. The plurality of data lines extends in the second direction. The first control unit supplies a control signal to the plurality of control lines. The second control unit supplies an image signal to the plurality of data lines.

In this display device, the plurality of pixels includes a first subpixel that emits light of a first color, a second subpixel that emits light of a second color, and a third subpixel that emits light of a third color. The first subpixel, the second subpixel, and the third subpixel include: a light emitting element; a capacitor; a write transistor that supplies the image signal supplied to the corresponding data line among the plurality of data lines to the capacitor, on the basis of the control signal supplied to the corresponding control line among the plurality of control lines; and a drive transistor that supplies a drive current corresponding to the voltage accumulated in the capacitor, to the light emitting element. The second control unit supplies the same image signal to two data lines corresponding to the two first subpixels provided in two pixels adjacent to each other in the first direction among the plurality of data lines.

The second control unit may supply the same image signal to the two data lines in the ith (i being an integer) horizontal period and the (i+n)th (n being an integer) horizontal period.

The second control unit may supply the same image signal to the two data lines in the ith horizontal period and the (i+n)th horizontal period in different frames.

Every predetermined frame, the second control unit may change the two data lines to which the same image signal is supplied in the ith horizontal period and the (i+n)th horizontal period.

In the (i+m)th (m being an integer that satisfiesm<n) horizontal period and the (i+m+n)th horizontal period, the second control unit may supply the same image signal to the two data lines to which the same image signal is supplied in the ith horizontal period and the (i+n)th horizontal period.

In the (i+m)th (m being an integer that satisfies m<n) horizontal period and the (i+m+n)th horizontal period, the second control unit may supply the same image signal to two data lines from which at least one of the two data lines to which the same image signal is supplied in the ith horizontal period and the (i+n)th horizontal period differs.

The second control unit may include a first latch, a second latch, and a selector. The first latch stores the image signal. The second latch stores a signal supplied from the first latch, and outputs the stored signal on the basis of a synchronization signal in a horizontal direction. The selector multiplexes the signals supplied from a plurality of the second latches, selects one of the multiplexed signals, and supplies the selected signal to the plurality of pixels.

The pixel may include subpixels that emits at least the three primary colors of RGB. In the pixels adjacent to each other in the second direction, the second control unit may cause the subpixels emitting R to emit light with the same intensity, and cause the subpixels emitting B to emit light with the same intensity.

In the adjacent pixels that cause the subpixels emitting R and B to emit light with the same intensity, the second control unit may cause the subpixels emitting G to emit light with the same intensity.

In the adjacent pixels that cause the subpixels emitting R and B to emit light with the same intensity, the second control unit may cause the subpixels emitting G to emit light with respective intensities based on the image signals for the respective pixels.

The second control unit may perform display by a doubler process in the first direction.

The second control unit may perform display by a binning process in the first direction.

The second control unit may perform display by a doubler process in the first direction and the second direction.

The second control unit may perform display by a binning process in the first direction and the second direction.

According to an embodiment, a first display device and a second display device that are the display devices according to any one of the above are included. The first display device displays an image to be visually recognized with one eye. The second display device displays an image to be visually recognized with the other eye.

In the electronic apparatus, the image displayed on the first display device and the image displayed on the second display device are images having parallax for both eyes.

A combination of the two signal lines of the first display device and a combination of the two signal lines of the second display device may be the same combinations in the same frame.

A combination of the two signal lines of the first display device and a combination of the two signal lines of the second display device may be different combinations in the same frame.

An image is not necessarily displayed on the second display device at a time when an image is displayed on the first display device, and an image is not necessarily displayed on the first display device at a time when an image is displayed on the second display device.

The first display device and the second display device may have the same frames in which images are not displayed.

BRIEF DESCRIPTION OF DRAWINGS

FIG. 19 is a diagram illustrating apparent colors according to an embodiment.

MODE FOR CARRYING OUT THE INVENTION

Figure 1:
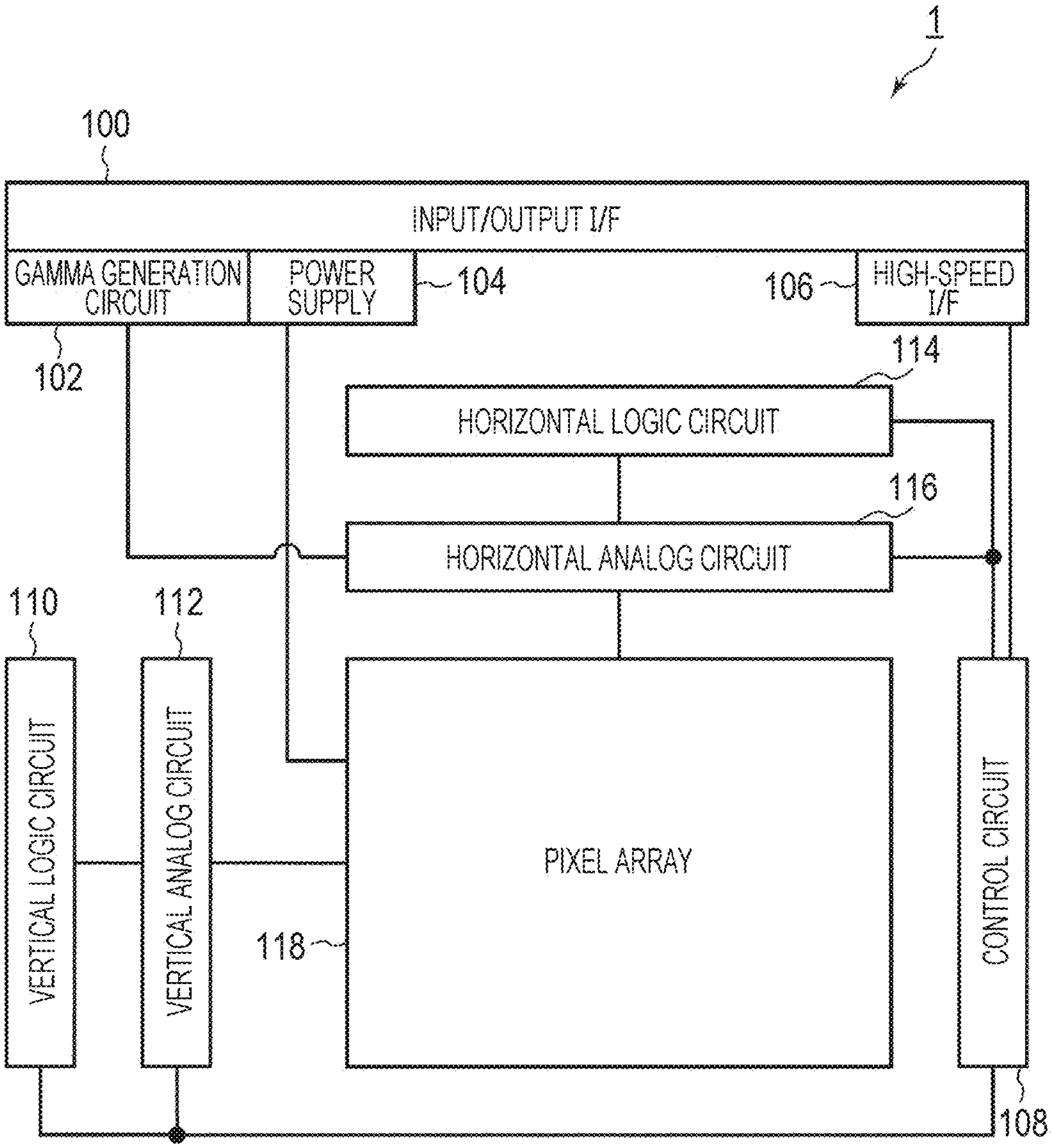
FIG. 1 is a block diagram schematically illustrating the display unit of a display device according to an embodiment.

The following is a description of embodiments of the present disclosure, with reference to the drawings. The drawings are used for explanation, and the shape and size of each component in actual devices, the ratios of size to other components, and the like are not necessarily as illustrated in the drawings. Further, since the drawings are illustrated in a simplified manner, it should be understood that components necessary for implementation other than those illustrated in the drawings are provided as appropriate.

FIG. 1 is a diagram illustrating an example of a pixel array and a peripheral circuit related to display of a display device 1 according to an embodiment.

The display device 1 includes a data input/output interface (input/output I/F 100), a gamma generation circuit 102, a power supply 104, a high-speed interface (high-speed I/F 106), a control circuit 108, a vertical logic circuit 110, a vertical analog circuit 112, a horizontal logic circuit 114, a horizontal analog circuit 116, and a pixel array 118. The display device 1 acquires video information as image information about each frame, and causes the light emitting elements included in the pixel array 118 to appropriately emit light, to appropriately display a moving image or a still image.

The input/output I/F 100 is an interface for inputting video data to be input to a circuit around the pixels. Other than that, the input/output I/F 100 may operate as an interface that transmits a signal from this peripheral circuit to the outside, if necessary.

The gamma generation circuit 102 is a circuit that generates and supplies a gamma voltage for lines of pixels included in the pixel array 118. Note that, in a case where a gamma voltage is not used, the gamma generation circuit 102 is not an essential component in the pixel value control process according to the present disclosure.

The power supply 104 is a power supply for converting a power supply voltage input from the outside into an appropriate power supply voltage, and applying the power supply voltage to a peripheral circuit of the pixel array 118. The power supply 104 includes a regulator such as a low drop out (LDO), for example.

The high-speed I/F 106 is an interface that transfers various kinds of signals input from the input/output I/F 100 to necessary portions at a high speed. The high-speed I/F 106 transmits a signal necessary for controlling the display unit to the control circuit 108, for example. The high-speed I/F 106 also acquires video data via the input/output I/F 100, for example, and transmits the video data to the control circuit 108.

The control circuit 108 is a circuit that controls processing to be performed by each circuit related to display. The control circuit 108 appropriately outputs a signal for controlling the vertical logic circuit 110 and the horizontal logic circuit 114, on the basis of frame data in a video image acquired via the high-speed I/F 106, for example. The control circuit 108 may also include a circuit that oscillates a clock signal, for example, and transmit the clock signal to an appropriate circuit.

The vertical logic circuit 110 generates a signal for controlling processing for each line in the pixel array 118, on the basis of the signal from the control circuit 108. The vertical logic circuit 110 outputs, to the vertical analog circuit 112, a digital control signal indicating for which line the signal is output in the pixel array 118, for example.

The vertical analog circuit 112 is a circuit that outputs a signal for controlling pixels in the pixel array 118, on the basis of the signal output from the vertical logic circuit 110. The vertical analog circuit 112 converts the digital signal output from the vertical logic circuit 110 into an analog signal for controlling pixels, for example, and controls the pixels in the pixel array 118 using the analog signal. From the vertical analog circuit 112, a plurality of control lines for controlling the pixels in the pixel array 118 is provided in the line direction (a first direction, for example) of the pixel array 118. A plurality of different control lines through which a plurality of signals for performing different control is transmitted may be provided for the pixels belonging to the respective lines in the pixel array 118.

The horizontal logic circuit 114 outputs, to the horizontal analog circuit 116, a digital control signal for the pixels belonging to each column in the lines controlled by the vertical logic circuit 110 and the vertical analog circuit 112, on the basis of a signal acquired via the control circuit 108.

The horizontal analog circuit 116 is a circuit that outputs a signal for controlling the pixels in the pixel array 118, on the basis of the signal output from the horizontal logic circuit 114. The horizontal analog circuit 116 converts the digital signal output from the horizontal logic circuit 114 into an analog signal for controlling pixels, for example, and controls the pixels in the pixel array 118 using the analog signal. For example, in a line designated by the vertical analog circuit 112, each pixel on the line emits light with an intensity designated by the horizontal analog circuit 116, to realize appropriate display. From the horizontal analog circuit 116, a plurality of data lines for transmitting data for emitting light from the light emitting elements in the pixels in the pixel array 118 are provided in the column direction (a second direction, for example) of the pixel array 118.

Note that the first direction and the second direction mentioned above are an example, and are not limited to these directions.

In the pixel array 118, pixels are arranged in a two-dimensional array. By emitting light with an appropriate intensity from each pixel, an image or the like is displayed on the display device 1. The arrangement of the pixels in the pixel array 118 may be the Bayer array or the like, for example, but is not limited to that. An embodiment of the present disclosure can be applied to any arrangement, as long as appropriate display can be performed.

Next, the circuits that control the pixels in the pixel array 118 are described in greater detail.

First Implementation Example

Figure 2:
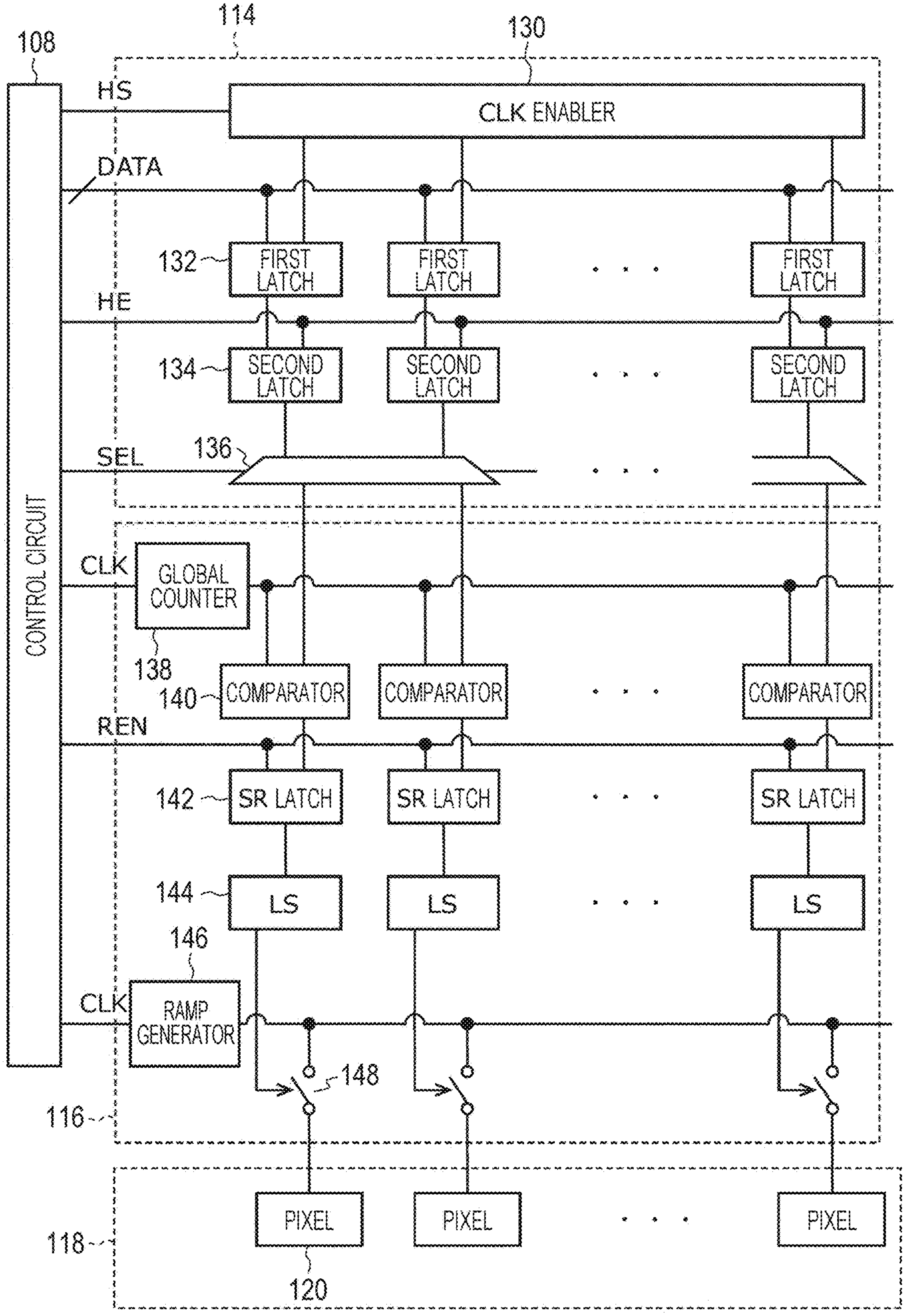
FIG. 2 is a diagram schematically illustrating the circuits related to horizontal control according to an embodiment.

FIG. 2 is a diagram illustrating the horizontal logic circuit 114 and the horizontal analog circuit 116 according to an embodiment, and its peripheral circuits in greater detail. Processing of pixel values in the present disclosure may be implemented by the above-described horizontal analog circuit 116, for example. However, the following is a non-limiting example, and implementations of the present disclosure are not limited to the example described below, but may be implemented in any circuit as long as pixel values can be appropriately processed. As illustrated in the drawing, the horizontal analog circuit 116 eventually outputs, to each pixel 120, a signal indicating a pixel value necessary for causing the pixel 120 to emit light. Each pixel 120 shown in the drawing is included in the pixel array 118 illustrated in FIG. 1.

The horizontal logic circuit 114 includes a CLK enabler 130, first latches 132, second latches 134, and demultiplexers 136. Meanwhile, the horizontal analog circuit 116 includes a global counter 138, comparators 140, SR latches 142, level shifters 144, a ramp generator 146, and switches 148.

The CLK enabler 130 receives a signal HS, which is a horizontal synchronization signal, from the control circuit 108, and outputs a signal for synchronizing operations of the horizontal logic circuit 114. Depending on the timing of an output from the CLK enabler 130, each component of the horizontal logic circuit 114 starts operating at an appropriate timing. The signal HS may be generated by a timing generator (not shown) included in the control circuit 108, or, in another example, the timing generator may be disposed outside the control circuit 108. The signal HS is a signal indicating the start of horizontal processing, for example, and is a signal that is supplied at the timing of a rise of a synchronization signal for turning on the horizontal processing or a very short time after the rise (a time at which the next processing can be started sufficiently after the rising processing).

The first latches 132 are provided for the respective pixels, for example. The first latches 132 operate as shift registers. A signal DATA indicating a pixel value from the control circuit 108 and a signal from the CLK enabler 130 are output to the first latches, and are appropriately subjected to a latch process.

The signal DATA may be generated by an image processing circuit (not shown) disposed in the control circuit 108, or, in another example, the image processing circuit may be disposed outside the control circuit 108. The signal DATA is a digital signal obtained by converting a YUV 422 format signal supplied as a video signal into a signal of the three primary colors RGB, for example. This RGB signal may be appropriately decimated as described later. Further, the signal DATA is not necessarily an RGB signal, but may be a signal in which a complementary color system is at least partially mixed, or may be a signal in which a W (white) signal is mixed.

The second latches 134 are provided for the respective pixels as the latches at the subsequent stage of the first latches 132, for example. Each second latch 134 is a latch that operates as a line buffer that stores a signal supplied from the first latch and outputs the signal at an appropriate timing. The second latch 134 appropriately outputs stored data with a signal HE output from the control circuit 108, for example. The signal HE is a signal corresponding to the signal HS, and is a signal that is supplied at the timing of a fall of a horizontal synchronization signal or a very short time before the fall (a time having a sufficient merge before the next processing).

Each demultiplexer 136 selectively outputs the signal DATA for an adjacent pixel 120 (or an adjacent pixel block as described later). On the basis of a signal SEL that is output from the control circuit 108, the demultiplexer 136 selects which the multiplexed signals output from the second latch 134 is to be eventually supplied to the pixel 120 as a pixel value. For example, in the example illustrated in FIG. 2, the signal SEL is a signal for selecting which pixel value is to be output to an adjacent pixel 120. That is, the demultiplexer 136 selects the pixel value between the pixel values of the adjacent pixels 120 is supplied as the pixel value of both of the pixels 120.

The horizontal logic circuit 114 outputs the digital signal output from the demultiplexer 136 to the horizontal analog circuit 116.

In the horizontal analog circuit 116, a signal that corresponds to each of the pixels 120 and is output from the horizontal logic circuit 114 is appropriately converted into an analog signal, and is output to each of the pixels 120 as a signal indicating emission intensity. This operation of the horizontal analog circuit 116 is not particularly different from that of a general horizontal scanning circuit. A horizontal scanning circuit may include the horizontal logic circuit 114 and the horizontal analog circuit 116.

The global counter 138 sets a counter, on the basis of a clock signal CLK that is output from the control circuit 108.

Each comparator 140 compares the counter value with the digital signal of the emission intensity of the pixel, and outputs the result.

Each SR latch 142 outputs the signal supplied from the comparator 140, on the basis of a signal REN indicating appropriate timing. The signal REN is a signal for supplying a ramp signal to the pixel 120 at an appropriate timing and causing the pixel 120 to emit light with an appropriate intensity, and is a signal that is supplied at a timing at which the ramp generator 146 starts a ramp or at a timing before or after the start of the ramp, for example.

Each level shifter 144 appropriately shifts the level of the voltage value of the signal that is output from the SR latch 142, and outputs the signal.

The ramp generator 146 generates a ramp signal on the basis of the clock signal CLK. This ramp signal is appropriately supplied to the switches 148 via a buffer.

Each switch 148 is controlled on the basis of the signal supplied from the level shifter 144.

As the flow of a series of processes, a signal indicating an appropriate intensity value output from each comparator 140 is output from the SR latch 142 at an appropriate timing. This signal is appropriately subjected to level shifting in the level shifter 144, to drive the switch 148 at an appropriate timing. As each switch 148 is driven in this manner, the ramp signal generated by the ramp generator 146 is output to each pixel 120 at an appropriate timing corresponding to the intensity value designated from the horizontal logic circuit 114, and each pixel 120 emits light with an appropriate intensity.

As described above, by sharing and appropriately controlling the pixel value in the signal DATA among a plurality of pixels through the demultiplexer 136, it is possible to enhance the visual resolution without an increase in the amount of transfer data. The resolution enhancement will be described later in detail.

The demultiplexers 136 may be disposed at appropriate positions in the horizontal analog circuit 116, instead of the horizontal logic circuit 114. The demultiplexers 136 may be disposed between the comparators 140 and the SR latches 142, for example. Alternatively, the demultiplexers 136 may be disposed between the SR latches 142 and the level shifters 144, for example. Alternatively, the demultiplexers 136 may be disposed between the level shifters 144 and the switches 148. Alternatively, the demultiplexers 136 may be provided in places of the switches 148.

Figure 3:
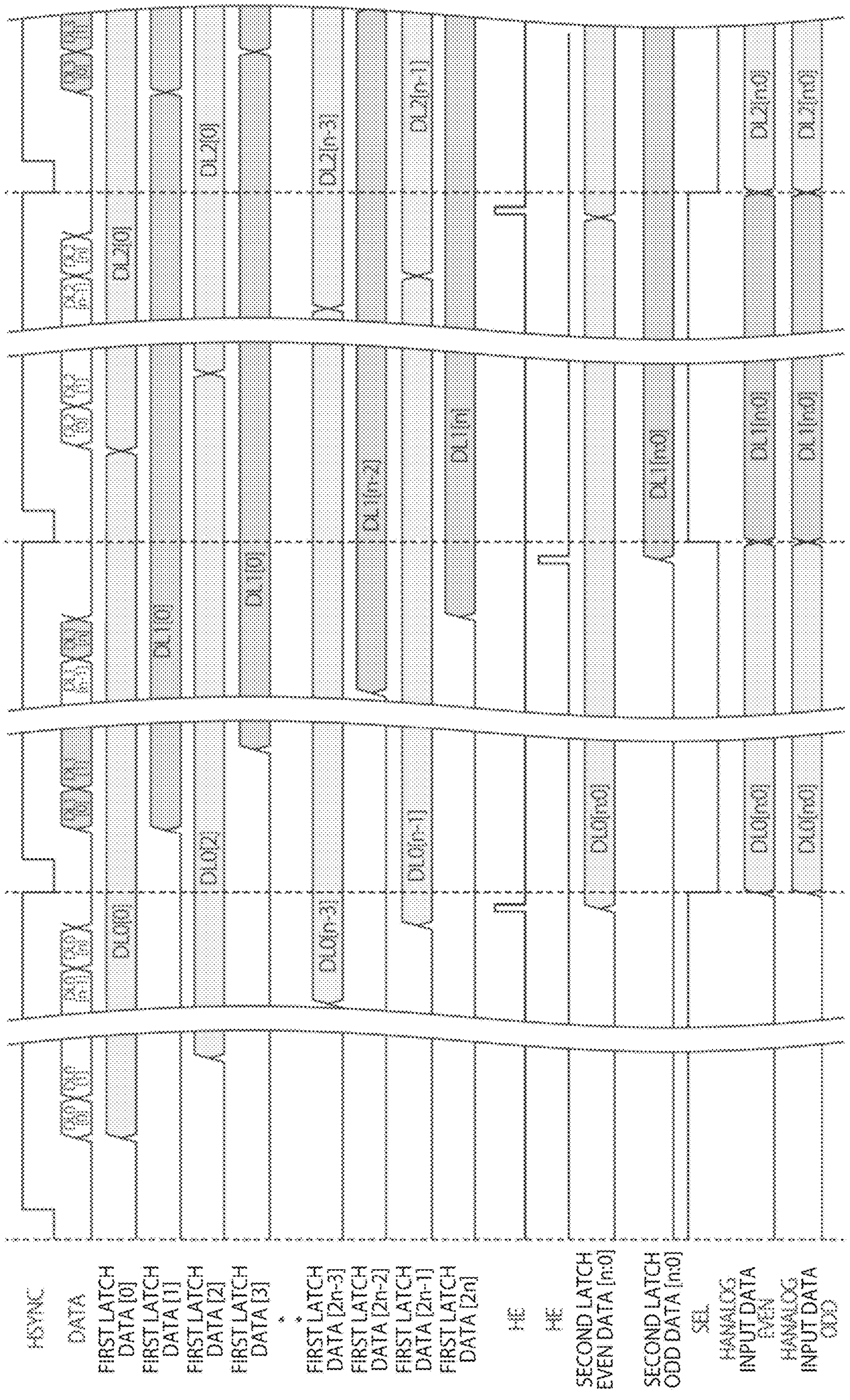
FIG. 3 is a timing chart according to an embodiment.

FIG. 3 is a diagram illustrating an example of the timing chart in FIG. 2. A horizontal synchronization signal, the signal DATA, the data stored in the first latches, the signal HE, the data stored in the second latches, and the signal SEL are shown in this order from the top.

The signal DATA is supplied in synchronization with a synchronization signal SYNC. Each pixel value included in this signal DATA is stored in an appropriate first latch. The period between timings of synchronization in the horizontal direction is defined as a horizontal period. That is, a horizontal period is a period during which the signal DATA is supplied by a synchronization signal HSYNC. When the signal HE is supplied on the basis of the synchronization state in the horizontal direction, this data is transferred to the second latches 134.

In the signal DATA, DLm [n] (m and n being integers) is shown, which indicates the signal value of the nth column on the mth line. The same applies to the notation in the latches and the like.

The demultiplexers 136 then appropriately transfer data to the horizontal analog circuit 116, on the basis of the signal SEL. The horizontal analog circuit 116 appropriately processes the supplied signals, to generate signals to be supplied to the pixels 120.

As shown in FIG. 3, the signal HE may be supplied separately through even-numbered lines and odd-numbered lines (the above m being an even or odd number, for example). By supplying the signal HE in such a manner, it is possible to output appropriate pixel values for the arrangement (n, m) of the respective pixels 120 for each subframe.

Second Implementation Example

The scanning circuit in the horizontal direction is not limited to the above implementation example.

Figure 4:
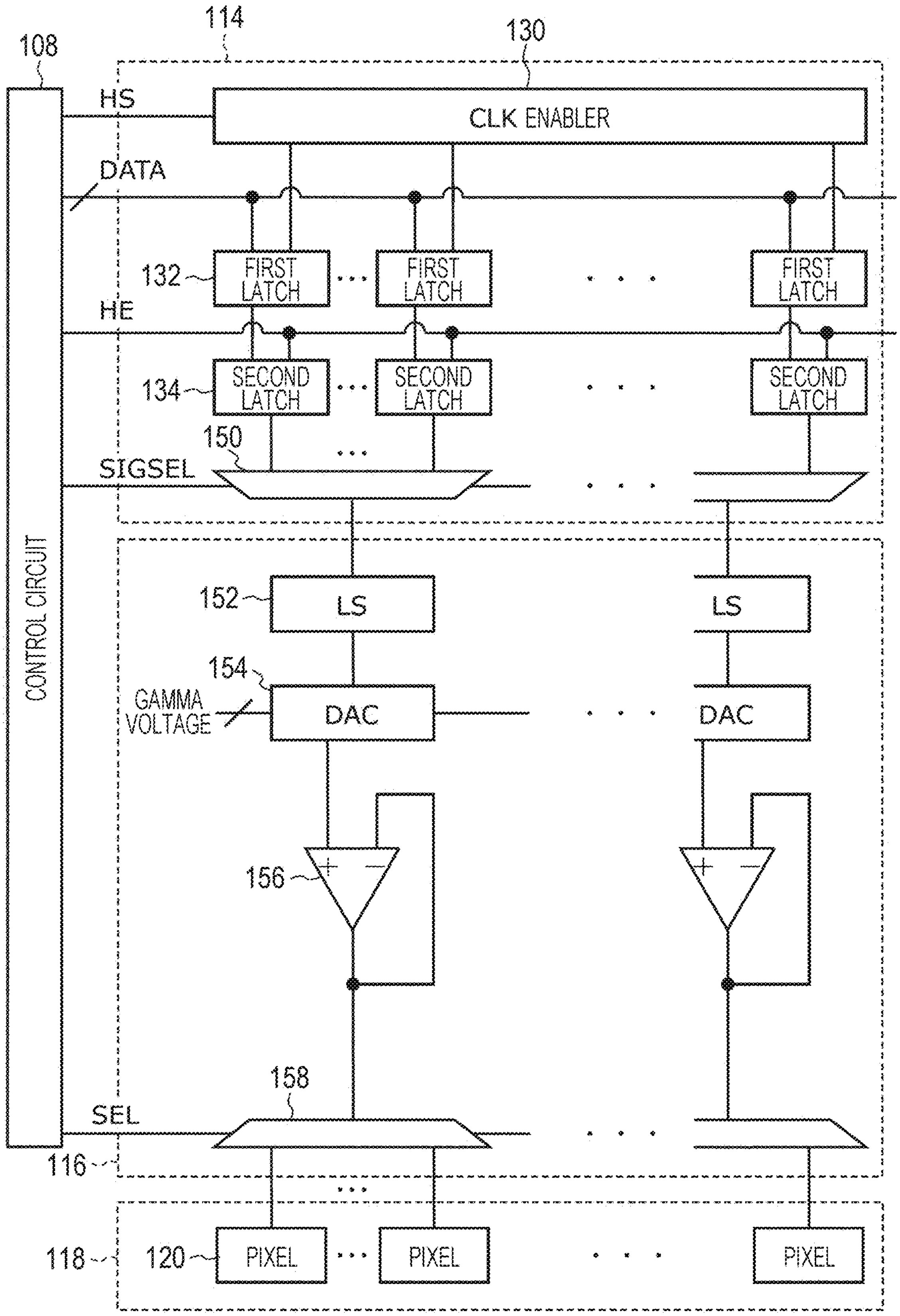
FIG. 4 is a diagram schematically illustrating the circuits related to horizontal control according to an embodiment.

FIG. 4 is a diagram illustrating another example of the horizontal drive circuits. As illustrated in FIG. 4, the digital-analog conversion in the horizontal analog circuit 116 may be performed by some other components.

The horizontal analog circuit 116 may include level shifters 152, digital-analog conversion circuits (DACs 154), amplifiers 156, and demultiplexers 158.

In the horizontal logic circuit 114, a signal indicating a pixel value for a plurality of adjacent pixels or pixel blocks in multiplexers 150 is output as sequential data on the basis of a signal SIGSEL, as in the first implementation example. For example, each multiplexer 150 outputs a signal related to a pixel value as a sequentially multiplexed signal, in accordance with the number of bits of the signal SIGSEL. Hereinafter, the unit for displaying one color will be also referred to as a unit of display.

Each level shifter 152 appropriately shifts and outputs the level of a signal supplied from the multiplexer 150. Unlike the demultiplexers 136 in FIG. 2, each multiplexer 150 is provided with a level shifter 152. That is, one level shifter 152 is provided for each unit of display. The same applies to the DACs 154 and the amplifiers 156 in the description below.

Each DAC 154 converts the signal output from the level shifter 152 into an appropriate voltage selected from the gamma voltage, and outputs the converted signal. As the gamma voltage is selected, the emission intensity of the pixel 120 is determined. The gamma voltage is supplied from the gamma generation circuit 102 in FIG. 1, for example.

Each amplifier 156 appropriately amplifies and outputs the signal supplied from the DAC 154. Note that, in a case where the signal is appropriately amplified in each DAC 154, the amplifiers 156 can be omitted.

Each demultiplexer 158 appropriately distributes the signal supplied from the amplifier 156 to the pixel 120 to which the pixel value supplied by the multiplexer 150 is applied. On the basis of the signal SEL, the demultiplexer 158 supplies a signal to each pixel 120 so as to emit light with an appropriate intensity. The number of bits of the signal SEL is the same as the number of bits of the signal SIGSEL.

Figure 5:
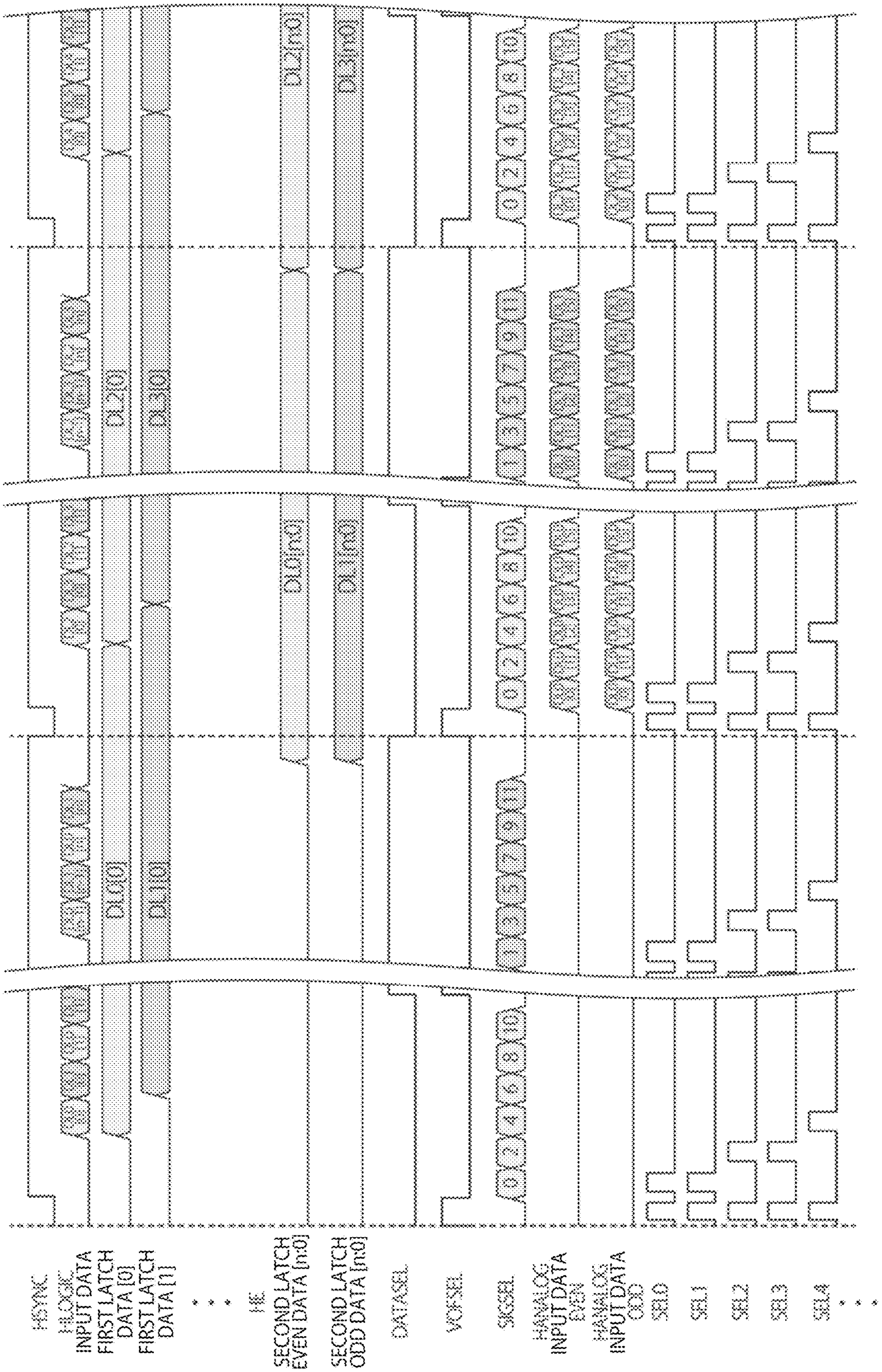
FIG. 5 is a timing chart according to an embodiment.

FIG. 5 is a timing chart in the example illustrated in FIG. 4. The upper half is the same as described above. The signal SIGSEL that is input to the multiplexers 150 is a sequential signal indicating which pixel is to be selected. Each multiplexer 150 outputs a digital signal indicating an appropriate pixel value to the horizontal analog circuit 116, on the basis of the signal SIGSEL.

Meanwhile, the demultiplexers 158 select and output an appropriate signal for each pixel, on the basis of the signal SEL.

The number of pieces of data that can be multiplexed varies depending on the number of bits of the signal SIGSEL and the signal SEL. For example, in a case where these signals are 10-bit signals, data of 12 pixels can be multiplexed, and be processed in the horizontal analog circuit 116.

Signals SEL0, SEL1, . . . in FIG. 5 are signals SEL to which indexes for the respective pixels 120 to be subjected to signal processing in one multiplexer 150 and one demultiplexer 158 are assigned. As the signals SEL0, SEL1, . . . are appropriately set, a signal can be appropriately supplied for each pixel 120. As illustrated in this timing chart, with signals for acquiring data at the same timings as SEL0 and SEL1, SEL2 and SEL3, and the like, it is possible to emit light with the same intensity for every two adjacent pixels.

Note that, in both the first implementation example and the second implementation example, the combination of two adjacent pixels does not change. However, the present invention is not limited to this, and a configuration in which the combination of two pixels is changed for each subframe or each frame may be adopted. For example, in the configuration in FIG. 4, by setting the combination of signals SEL in FIG. 5 as SEL0=SEL1<SEL2=SEL3<SEL4 . . . in a certain subframe (the inequality sign < indicates that the right side is later in timing than the left side) and as SEL0<SEL1=SEL2<SEL3=SEL4 . . . in the next subframe, it is possible to change adjacent combinations, depending on subframes.

Third Implementation Example

In the above implementation examples, any specific mode of the pixels 120 has not been described. Each of the pixels 120 may be appropriately provided with a color filter, and one color may be output, a unit of display being a plurality of pixels 120, or four pixels 120 (a pixel block), for example. In another example, a region of divided pixels that are not affected by light emission in other regions may be formed for each region in each pixel 120, a color filter may be provided for each of the divided pixels in the pixel 120, and the emission intensity for each of the divided pixels may be controlled to output one color with one pixel 120 as a unit of display. The color filter can be replaced with some other component such as an organic photoelectric conversion film, for example.

For example, in the first implementation example and the second implementation example described above, for the pixels 120 belonging to a unit of display that outputs one color, the same processing is performed in accordance with the color and luminance to be output by the unit of display, and the processing of the signal value in the unit of display or an adjacent unit of display is performed. Thus, a doubler process in the horizontal direction can be performed.

On the other hand, the sensitivity of human eyes is higher for luminance than for color. Therefore, the G pixels 120 and the like that output information close to luminance information are not decimated, while the pixels 120 for the other colors are decimated. Note that W may be used instead of G. For example, it is also possible to include pixels 120 or the like of a color that output information close to the luminance value of emerald or the like, and adopt a similar implementation for the pixels of this color.

In the description below, a mode in which a unit of display is a pixel block, a color filter or the like is provided for each pixel 120, and each pixel block outputs one color is described. However, as described in the preceding paragraphs, a mode in which the region of each pixel 120 is divided into a plurality of regions and, light of an appropriate color mixed for each pixel 120 is emitted as a unit of display may be adopted.

Figure 6:
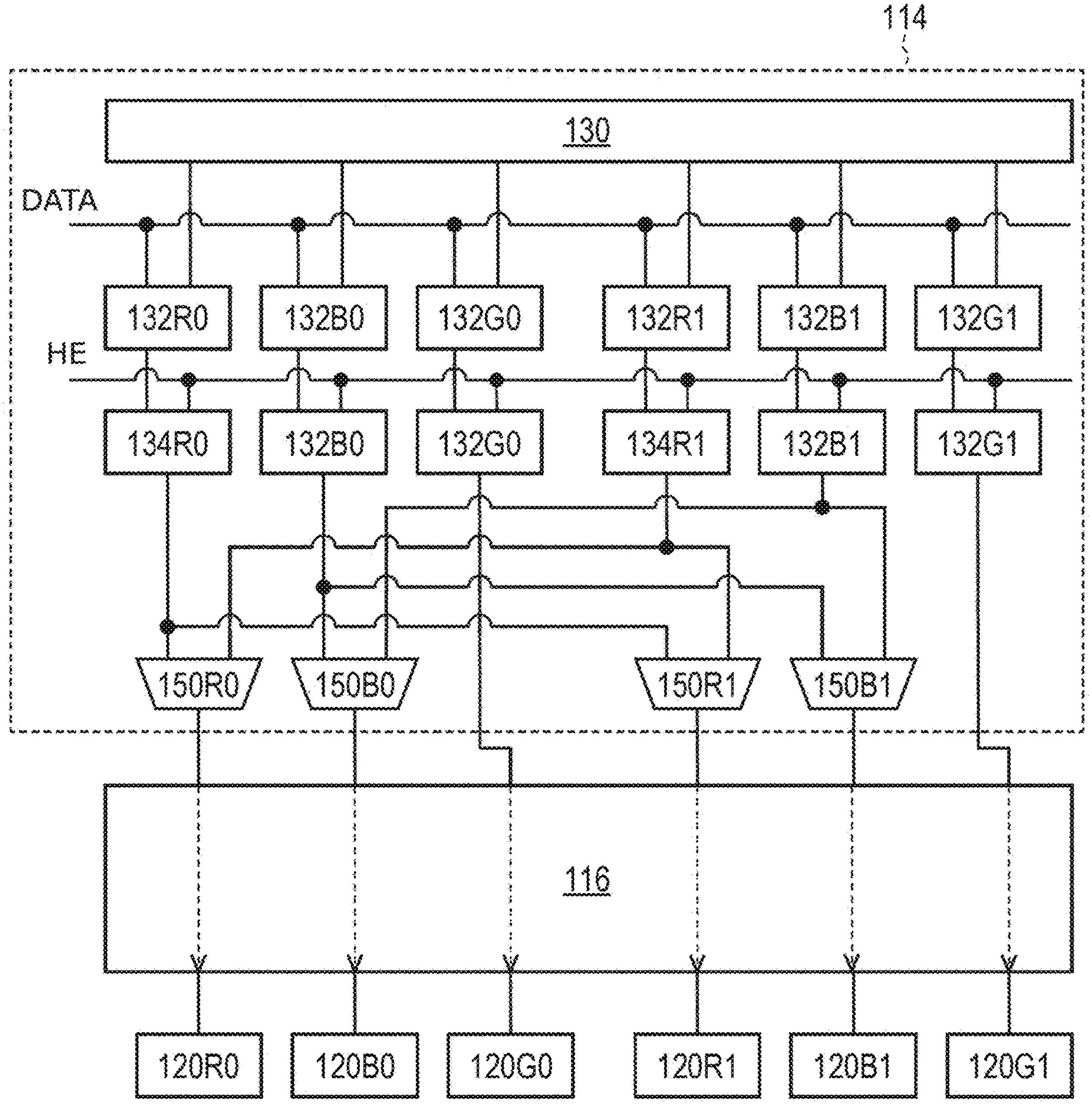
FIG. 6 is a diagram schematically illustrating the circuits related to horizontal control according to an embodiment.

FIG. 6 is a diagram illustrating an example of horizontal drive circuits in which color information is taken into consideration. For example, a case where RGB is used as the colors is described below. However, as described above, the colors are not limited to RGB, and a combination of other colors may be adopted as appropriate. Furthermore, with the configuration of this example, the present invention can be applied, without being limited to a color array.

The horizontal analog circuit 116 may have a configuration similar to that illustrated in FIG. 2 or 4, for example. Therefore, the horizontal analog circuit 116 is not described in detail herein. Furthermore, the configuration of the horizontal logic circuit 114 can also be appropriately applied to any of the modes in FIGS. 2 and 4, on the basis of the definition of the processing.

The horizontal logic circuit 114 includes first latches 132R0, 132B0, 132G0, 132R1, 132B1, 132G1, . . . as the first latches 132 that receive pixel values. C of 132Cx is color information, and x indicates a column number. For example, when C is R, the pixel 120 emits red light. When C is B, the pixel 120 emits blue light. When C is G, the pixel 120 emits green light. When x is 0, the pixel 120 belongs to the 0th column. When x is 1, the pixel 120 belongs to the first column.

Each first latch 132Cx supplies the stored signal to the second latch 134Cx at an appropriate timing based on the output from the CLK enabler 130. The signals stored in the second latches 134Rx and 134Bx are supplied to the multiplexers 150Rx and 150Bx at appropriate timings based on the signal HE.

In this implementation example, the second latch 134R0 also sends an output to the multiplexer 150R1 at this point of time. Likewise, a signal is supplied from each second latch 134C0 to each multiplexer 150C1 (C being R or B), and a signal is supplied from each second latch 134C1 to each multiplexer 150C0 (C being R or B). In this manner, R and B signals for adjacent pixels 120 may be output to each other multiplexer.

Furthermore, regarding G, a signal may be supplied for each pixel, without data decimation.

The output of each multiplexer 150Cx is appropriately processed in the horizontal analog circuit 116, and operates to appropriately perform a doubler process in the horizontal direction. On the other hand, DA conversion or the like is appropriately performed on the green pixels 120 or the like, and the result is output from the pixels 120 or the like.

In this manner, the pixels 120 and the like compatible with luminance values are not decimated while the other colors are decimated, so that the data transfer amount can be reduced (without an increase in the data transfer rate), and a video image more natural for the human eye can be displayed.

First Embodiment

In the description below, processes for the colors of the pixels 120 and the like by a specific doubler process is explained described. These processes can be implemented by the circuits of each of the implementation examples described above. Further, the following embodiments of the present disclosure are not limited to the above examples, and may be implemented by other circuit configurations. Unless otherwise specified, the term "color" may include a concept such as brightness (intensity) in addition to a combination of colors.

Furthermore, in the following embodiments, for the pixels 120 that output the same color or the same intensity, the same image signal is input at the same timing (including the same horizontal period) to the data line connected to the pixels 120 that output the same color or the same intensity. As the same image signal is supplied to a plurality of data lines or two data lines in this manner, for example, it is possible to control the combination of the pixels 120 that emit light of the same color or intensity. This combination is controlled in each embodiment.

Also, the combination is changed for each appropriate subframe, or control is performed so that the same combination is obtained n subframes after a certain subframe. In this manner, operations according to the embodiments described below can be implemented. Further, in a case where the same combination is set at intervals of a predetermined time (each subframe), the same image signal is output to two data lines in the same combination as the subframe m subframes after a certain subframe and the subframe (m+n) subframes after the certain subframe. Here, m and n are integers. The subframes may be read as frames.

Figure 7:
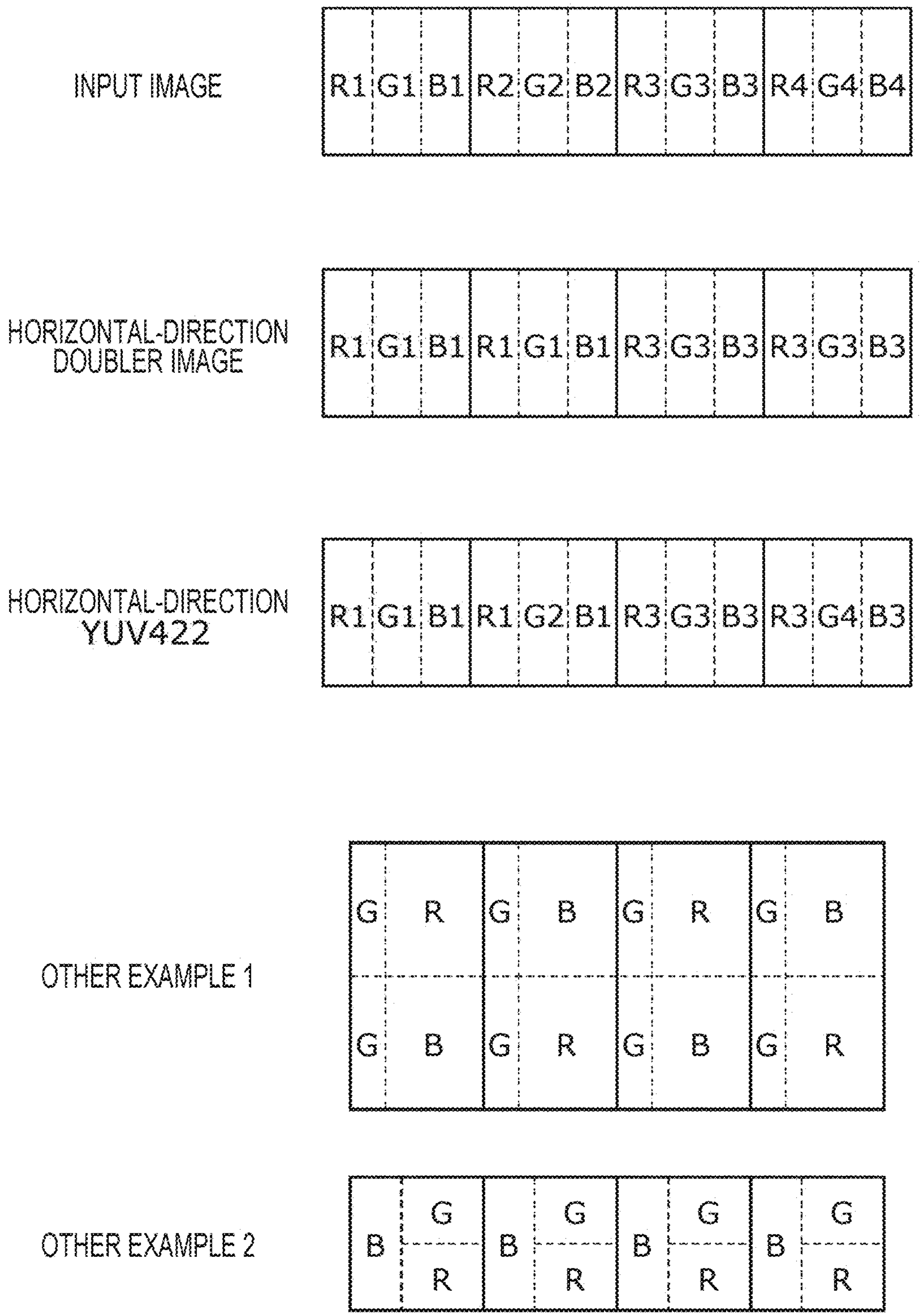
FIG. 7 is a diagram illustrating luminance information about a subframe to be output to pixels according to an embodiment.
Figure 8:
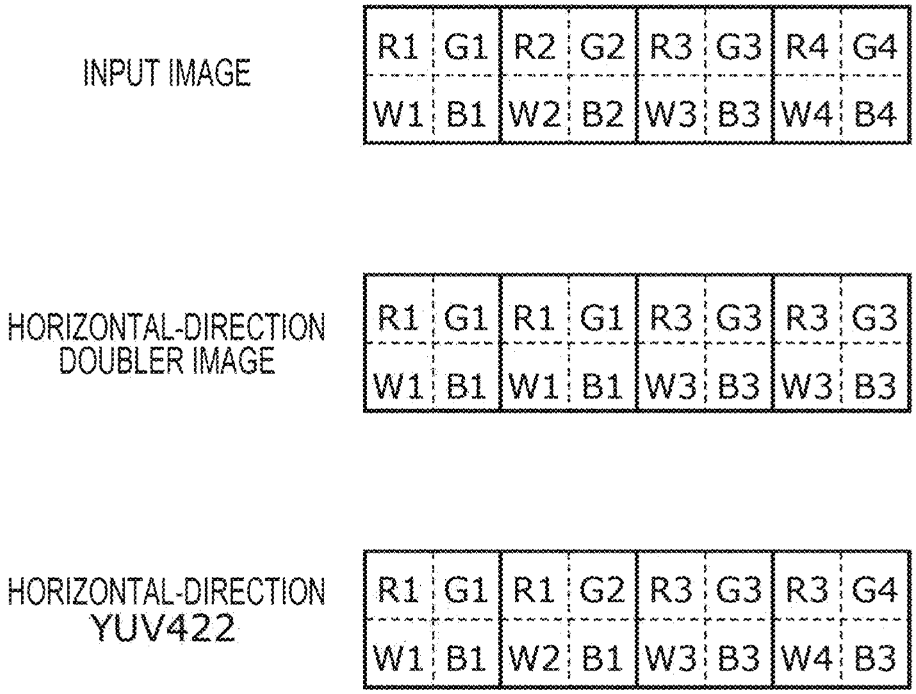
FIG. 8 is a diagram illustrating luminance information about a subframe to be output to pixels according to an embodiment.

FIG. 7 is a diagram illustrating an input image and a horizontal-direction doubler image for the input image according to an embodiment. As described above, in the example described below, three pixels in a pixel block are used in the explanation. However, embodiments are not limited to this. That is, three divided pixels may be included in one pixel, and be operated in a similar manner. Further, a pixel block is not necessarily formed with three pixels, but may be formed with more pixels. Likewise, each one pixel may include three divided pixels, or include more divided pixels than the four illustrated in FIG. 8. Furthermore, the color array is basically a Bayer array as illustrated in FIG. 7. However, in a RGBW array as illustrated in FIG. 8 and other various arrays, a doubler process and a binning process in the horizontal/vertical direction described below can also be performed.

The uppermost chart is obtained by extracting the pixels 120 of three pixel blocks from the pixel array 118. What kind of doubler process is performed on the pixels is illustrated in the two charts that follow.

The input pixel blocks are color information C1, C2, C3, and C4, for example. C1 is formed with a combination of pixels 120 of R1, G1, and B1, C2 is formed with a combination of pixels 120 of R2, G2, and B2, C3 is formed with a combination of pixels 120 of R3, G3, and B3, and C4 is formed with a combination of pixels 120 of R4, G4, and B4. In a case where such three pixels are aligned, as illustrated in the middle chart, the doubler image in the horizontal designates the intensities of the color values of the pixels 120 so that C1, C1, C3, and C3 are arranged in this order in each pixel block, for example.

In a case where the format of the video signal is the YUV422 format, the intensity of G may be processed without decimation, as described above. In this case, as illustrated in the lower chart, R1, G1, and B1 are output as the pixel block corresponding to C1 of the input image, R1, G2, and B1 are output for C2, R3, G3, and B3 are output for C3, and R3, G4, and B3 are output for C4.

Note that, a pixel structure of a striped type is adopted in the above description, but embodiments are not limited to this. For example, the configuration of the pixels may be of a pentile type as illustrated as Other Example 1 in FIG. 7, or may be of an S-stripe type as illustrated as Other Example 2. Further, the pixel array is not limited to this, but may be a mosaic array or a delta array, for example, and the pixel shape is not necessarily rectangular. An embodiment of the present disclosure can be applied to any array and shape, as long as the pixels that output one color are appropriately arranged.

FIG. 8 illustrates an example in which pixels 120 in an RGBW array are used as another example. As illustrated in the middle chart, the outputs of the pixels 120 of R1, G1, B1, and W1 may be supplied for C1 and C2, and the outputs of the pixels 120 of R3, G3, B3, and W3 may be supplied for C3 and C4.

Further, in a case where a signal in the YUV422 format is input, a decimation process may not be performed on G and W as illustrated in the lower chart. In this case, G may also be subjected to the decimation process, and only W may not be subjected to the decimation process. Conversely, W may also be subjected to the decimation process, and only G may not be subjected to the decimation process.

For example, in a case where a signal of an input image as illustrated in FIGS. 7 and 8 is input in all frames, the display device 1 may perform display as illustrated in the middle chart or the lower chart.

As described above, according to the present embodiment, the amount of data to be transferred can be constantly reduced to about ½. Thus, the frame rate can be increased without a change in the transfer speed.

Second Embodiment

Figure 9:
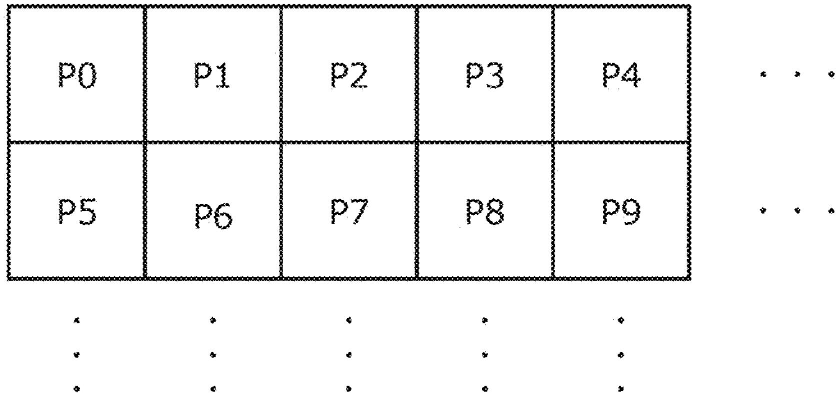
FIG. 9 is a diagram illustrating an input pixel signal according to an embodiment.

FIG. 9 is a diagram illustrating an intensity signal of an input image according to an embodiment. In FIG. 9, ten pixels are extracted from the pixel array 118.

The display intensities of the ten pixels is combined for each pixel block, and is shown as Px. For example, in a pixel block shown as P0, a color is designated by a pixel 120 of R0, a pixel 120 of G0, and a pixel 120 of B0. A data decimation process for such an input display signal is now described through some examples. Further, P0 may include information W0, as in FIG. 8.

Figure 10:
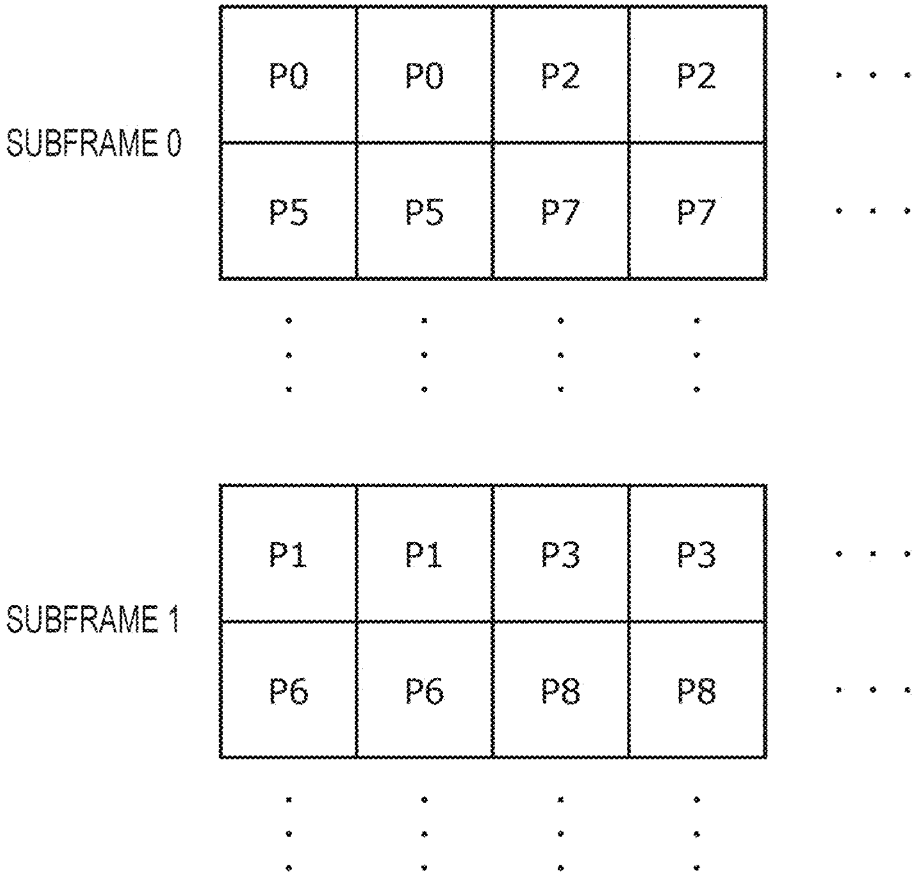
FIG. 10 is a diagram illustrating display according to an embodiment.

FIG. 10 is a diagram illustrating an example of a doubler process in the horizontal direction according to an embodiment.

In a subframe 0, the upper left pixel block and the pixel block to the right of the upper left pixel block output a color P0, and the pixel block to the right and the pixel block to the further right output a color P2. Likewise, in the next line, adjacent pixel blocks each output a color P5 or a color P7.

In a subframe 1 subsequent to the subframe 0, the combinations of pixel blocks outputting the same color are similar to those in the subframe 0, and the colors related to the pixel blocks of different combinations of P1, P3, P6, and P8 are output. In this manner, colors are not formed with the same combinations at all times as illustrated in FIGS. 7 and 8, but signals to output may be switched for each subframe in accordance with a combination of two pixel blocks.

Third Embodiment

Figure 11:
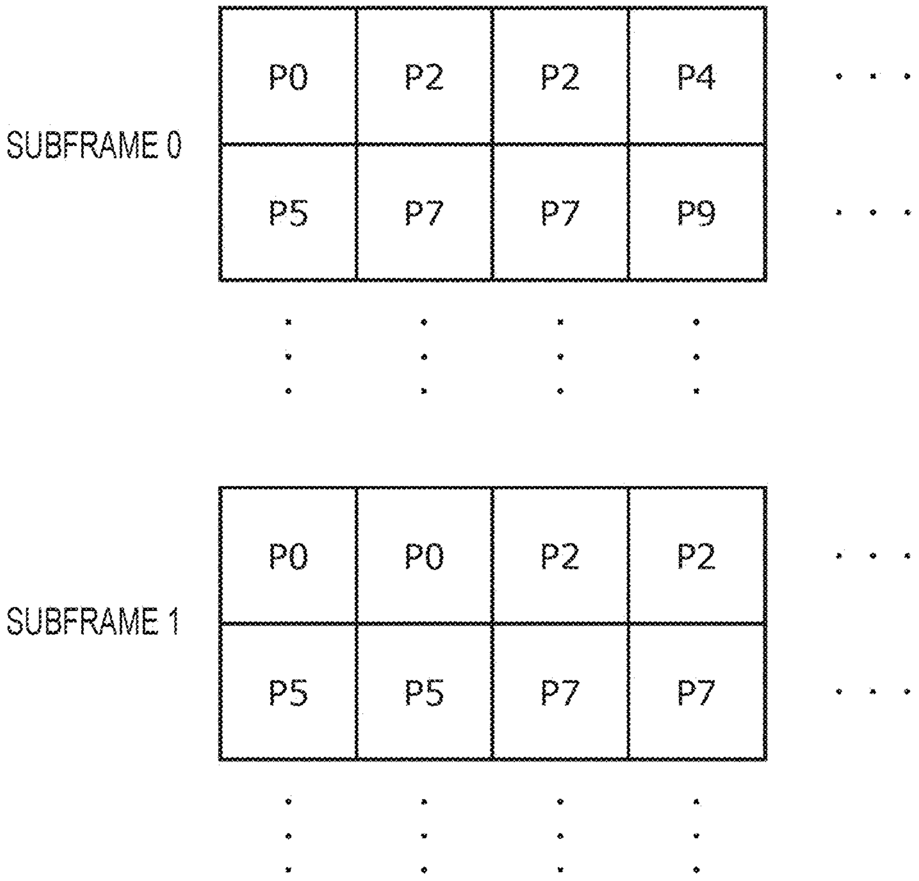
FIG. 11 is a diagram illustrating display according to an embodiment.

FIG. 11 is a diagram illustrating an example of a binning process in the horizontal direction according to an embodiment.

In the subframe 0, the upper left pixel block, and the two pixel blocks to the right of the upper left pixel block, . . . output the same colors. For example, the upper left pixel block may output P0, the two pixel blocks to the right of the upper right pixel block may output P2, and the two pixel blocks to the right thereof may output P4. Likewise, in the next line, the pixel blocks each output P5, P7, P7, or P9.

In the subframe 1, P0, P0, P2, P2, . . . are output in this order from the upper left pixel block, and P5, P5, P7, P7, . . . are output in the next line. In this manner, a binning process may be performed in the horizontal direction, instead of a doubler process in the horizontal direction in which the same combinations of pixel blocks output colors in all the subframes.

As the binning process is performed, the resolution in visual recognition can be made higher than in a case where a doubler process is performed.

Fourth Embodiment

Figure 12:
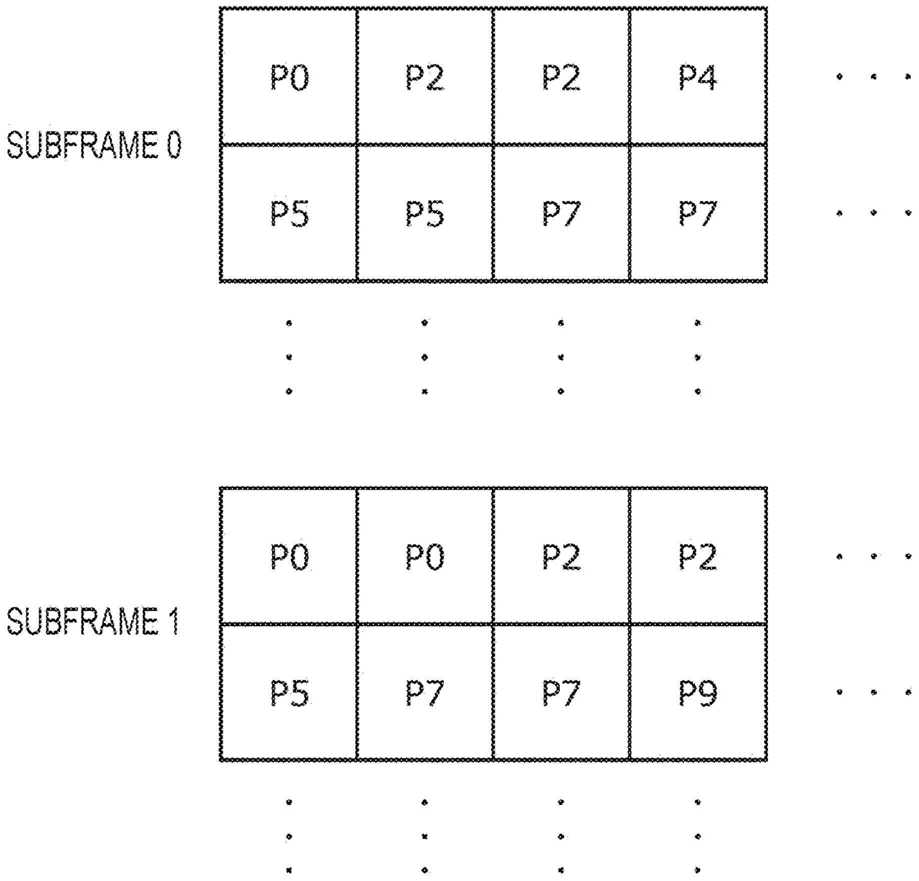
FIG. 12 is a diagram illustrating display according to an embodiment.

FIG. 12 is a diagram illustrating an example of a binning process in the horizontal direction according to an embodiment.

In the subframe 0, the upper left pixel block, and the two pixel blocks to the right of the upper left pixel block, . . . output the same colors. For example, the upper left pixel block may output P0, the two pixel blocks to the right of the upper right pixel block may output P2, and the two pixel blocks to the right thereof may output P4.

In the next line, the combinations in the horizontal direction is different from those in the above line. The two adjacent pixel blocks from the left output the same color, the two adjacent pixel blocks to the right thereof output the same color, and the like. For example, colors P5, P5, P7, and P7 are displayed for the respective pixel blocks in this order from the left. In this manner, the pixel blocks to be combined may be different in each adjacent line.

In this state, in the subframe 1 subsequent to the subframe 0, a horizontal binning process is performed with combinations of P0, P0, P2, and P2 and the subframe 0 in the upper line. Likewise, in the next line, a horizontal binning process is performed with P5, P7, P7, and P9.

As described above, a binning process may be performed on the combinations of pixel blocks in the horizontal direction, which are different in each line. As such a process is performed, generation of streaky noise in the vertical direction can also be reduced.

Further, the combinations that are different in each line are not limited to a binning process, but may be subjected to a doubler process. For example, the combinations of display of the pixel blocks in the subframe 0 illustrated in FIG. 12 may be the combination of pixel blocks in a doubler process. That is, regardless of the frames, the same colors may be displayed in the upper left pixel block, the two adjacent pixel blocks to the right of the upper left pixel block, the two adjacent pixel blocks to the right thereof, and the like. In the next line, the same colors may be displayed in the left end pixel block and the pixel block to the right thereof, the two adjacent pixel blocks to the right thereof, and the like.

Fifth Embodiment

Figure 13:
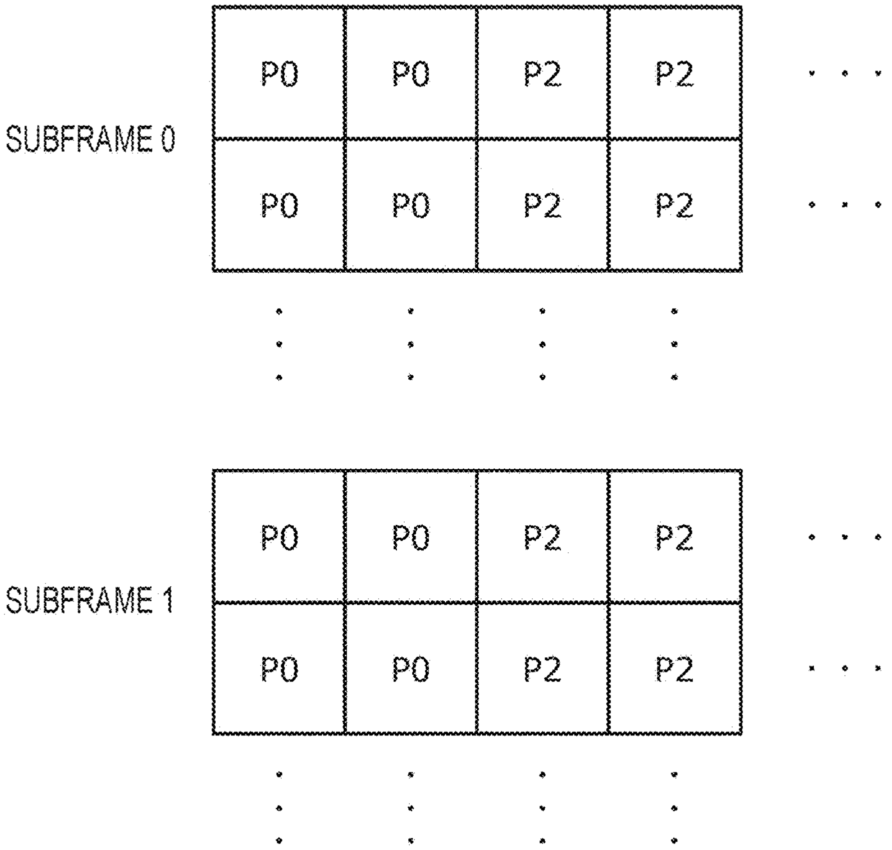
FIG. 13 is a diagram illustrating display according to an embodiment.

FIG. 13 is a diagram illustrating an example of a doubler process according to an embodiment.

In the present embodiment, 2×2 pixel blocks are displayed in the same color, and output the same color. That is, a doubler process is performed in the horizontal direction, and a doubler process is also performed in the vertical direction. As display is performed in this manner, the data transfer amount in the horizontal direction can be reduced, and the data transfer amount in the vertical direction can also be reduced.

In the subframe 0 and the subframe 1, the same colors are displayed in the pixel blocks, but these colors can be changed as appropriate. For example, in the subframe 0, the color P0 is displayed in the 2×2 pixel blocks on the left side. Further, in the subframe 1, any one of the colors P1, P5, and P6 may be displayed in the 2×2 pixel blocks on the left side. The same applies to the pixel blocks on the right side, and any one of the colors P3, P7, and P8 may be displayed in the subframe 1.

In this case, combinations of colors to be displayed can also be set as appropriate. For example, a combination of P1 and P3 may be displayed, a combination of P5 and P7, or a combination of P6 and P8 may be displayed.

As described above, the layout may not be the same for each group of pixel blocks, but may be a combination of P1 and P7, or some other combination, for example.

Also, a subframe 2 and a subframe 3 may be further provided, four combinations of colors to be displayed may be prepared, and display may be performed in the order of the four combinations.

As described above, in addition to a doubler process in the horizontal, a doubler process in the vertical direction may be performed before display. For example, in the case of display as illustrated in FIG. 13, the resolution is halved in each of the horizontal direction and the vertical direction, but the data transfer amount can be reduced to about ¼.

Sixth Embodiment

In each of the embodiments described above, the combinations in the case of two lines have been described. However, the combinations may be further expanded, and combinations in the case of four lines may be considered.

Figure 14:
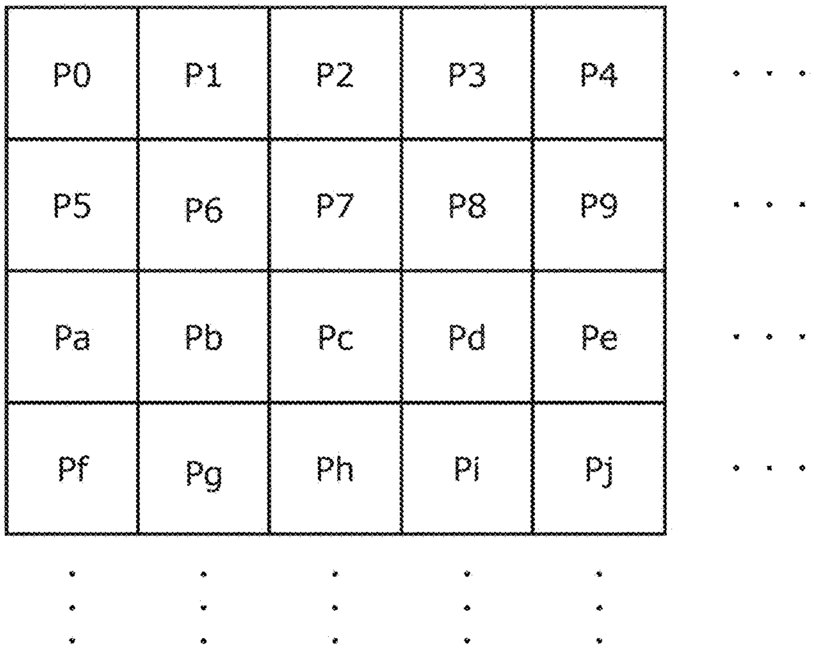
FIG. 14 is a diagram illustrating an input pixel signal according to an embodiment.

FIG. 14 is a diagram illustrating display colors to be input as an image signal. In the embodiment described below, various processes are explained on the basis of the input signal illustrated in this drawing. First, in the present embodiment, a mode in which the doubler process in the fifth embodiment is replaced with a binning process, which is a mode in which a binning process is performed in the horizontal direction and the vertical direction, is described.

FIGS. 15 to 18 are diagrams illustrating an example in which a horizontal/vertical binning process is performed for each subframe.

Figure 15:
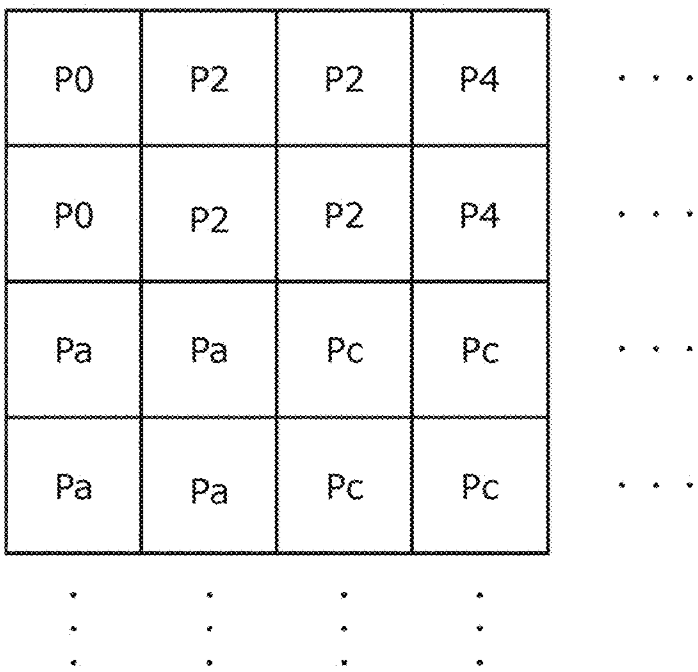
FIG. 15 is a diagram illustrating display according to an embodiment.

In the subframe 0, as illustrated in FIG. 15, P0, P2, P2, P4, . . . are displayed in the respective pixel blocks in the two lines from the top as opposed to the input display colors illustrated in FIG. 14, and Pa, Pa, Pc, Pc, . . . are displayed in the subsequent two lines, for example.

Figure 16:
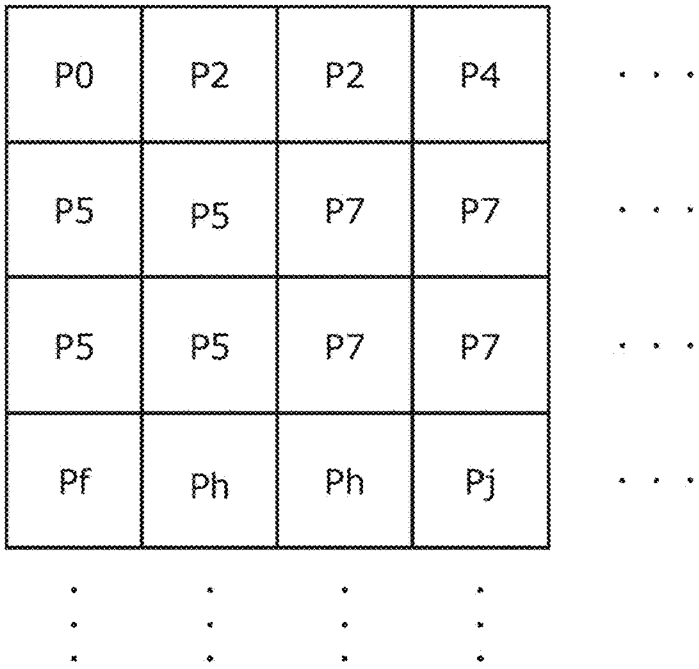
FIG. 16 is a diagram illustrating display according to an embodiment.

In the subframe 1, as illustrated in FIG. 16, P0, P2, P2, P4, . . . , P5, P5, P7, P7, . . . , P5, P5, P7, P7, . . . , Pf, Ph, Ph, Pj, . . . are displayed in the respective pixel blocks in this order from the top line, for example. The transition from the subframe 0 to the subframe 1 corresponds to a binning process in the vertical direction.

Figure 17:
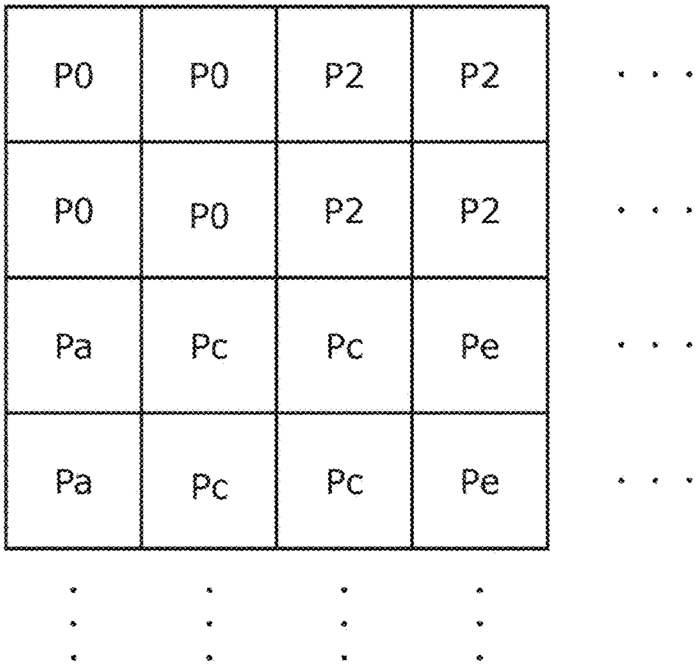
FIG. 17 is a diagram illustrating display according to an embodiment.

In the subframe 2, as illustrated in FIG. 17, P0, P0, P2, P2, . . . , P0, P0, P2, P2, . . . , Pa, Pc, Pc, Pe, . . . , Pa, Pc, Pc, Pe, . . . are displayed in the respective pixel blocks in this order from the top line, for example. The transition from the subframe 1 to the subframe 2 corresponds to a process of performing a horizontal binning process and a vertical binning process in parallel.

Figure 18:
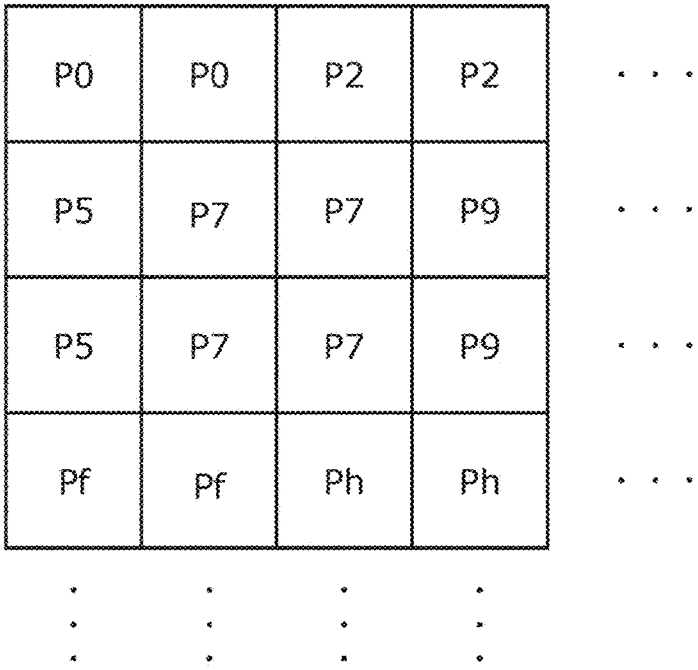
FIG. 18 is a diagram illustrating display according to an embodiment.

In the subframe 3, as illustrated in FIG. 18, P0, P0, P2, P2, . . . , P5, P7, P7, P9, . . . , P5, P7, P7, P9, . . . , Pf, Pf, Ph, Ph, . . . are displayed in the respective pixel blocks in this order from the top line, for example. The transition from the subframe 2 to the subframe 3 corresponds to a binning process in the vertical direction.

Further, after the subframe 3, the process starting from the subframe 0 may be repeated. The transition from the subframe 3 to the subframe 0 corresponds to a process of performing a horizontal binning process and a vertical binning process in parallel.

FIG. 19 is a diagram illustrating what colors are displayed on a time average in a case where the processes from FIG. 15 to FIG. 18 are performed. A portion in which a plurality of numbers or alphabets are shown following P corresponds to displaying an average value of the colors. As can be seen from this drawing, the resolution in visual recognition does not become lower when a decimation process according to the present embodiment is performed.

According to the present embodiment, signals of color information about the pixels can be decimated in both the horizontal direction and the vertical direction, and a decrease in resolution can be avoided, as illustrated in FIG. 19.

It is possible to implement the display illustrated in the first to sixth embodiments by appropriately combining selectors (multiplexers and demultiplexers) to form a circuit configuration, and appropriately defining the signal SIGSEL and the signal SEL, for example. As the pixel signal decimation process is appropriately performed in this manner, the amount of transfer data can be reduced. Meanwhile, the resolution can also be appropriately selected. As a result, an output image from several resolutions can be selected at a desired frame rate. That is, it is possible to display a video image at a high frame rate, while appropriately maintaining image reconstruction accuracy.

Seventh Embodiment

In each of the embodiments described above, one video image has been described. However, a mode according to the present disclosure can also be applied to a plurality of video signals. For example, in a case where an image having parallax is output to both eyes and is stereoscopically viewed with limited resources in the same device (electronic apparatus), a decimation process according to the present disclosure can also be performed. For example, the embodiment described below can be used for a display panel in an electronic apparatus for AR, VR, or the like.

In this electronic apparatus, both a display device that displays an image to be visually recognized with one eye (the left eye, for example) and a display device that displays an image to be visually recognized with the other eye (the right eye, for example) are implemented by the display device 1 described in the above implementation examples. In addition to the above, each of the display devices may perform a doubler process and/or a binning process according to or similar to each of the above embodiments, and may further perform an operation of decimating data so as not to reduce visibility when viewed with both eyes. In the description below, some embodiments of data decimation in two display devices 1 are explained.

Figure 20:
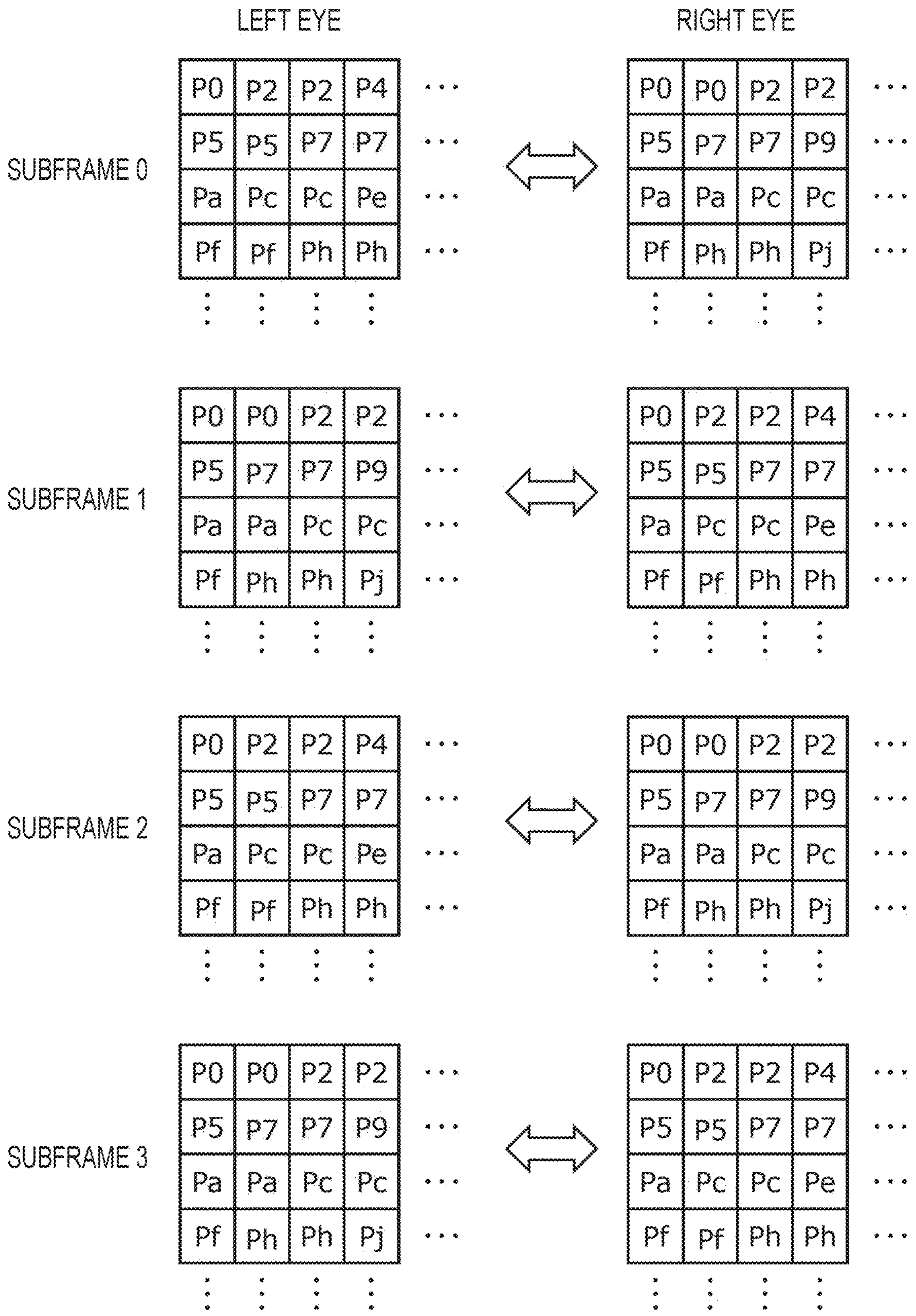
FIG. 20 is a diagram illustrating display according to an embodiment.

FIG. 20 is a diagram illustrating an example in which a video image for both eyes are output according to an embodiment. The input signals are the same as that illustrated in FIG. 14 for both the right and left eyes. A horizontal binning process may be performed on both the image for the left eye and the image for the right eye.

The combinations of pixel blocks displaying the same colors are made different between the left eye and the right eye. Thus, in a case where viewing with both eyes is performed, the data transfer amount can be reduced, without a pseudo decrease in resolution.

Note that embodiments are not limited to this mode, and the combinations of pixel blocks for the left eye and the combinations of pixel blocks for the right eye may be arranged in the same array, due to calculation resources or the like. In this case, it is also possible to increase the frame rate while maintaining a sufficiently high resolution. Since the images for the right and left eyes are displayed at the same timing, it is possible to temporally avoid a decrease in resolution, and spatially avoid a decrease in resolution.

That is, in both the display devices 1, an operation according to each of the embodiments described above may be performed for a combinations of the same two data lines in the same subframe, or an operation according to each of the embodiments described above may be performed for a combination of different two data lines in the same subframe. For example, in the case as illustrated in FIG. 7, in the two display devices 1, the same image signal (pixel value) corresponding to each image is input for a combination of two data lines shifted one pixel from each other.

Eighth Embodiment

Figure 21:
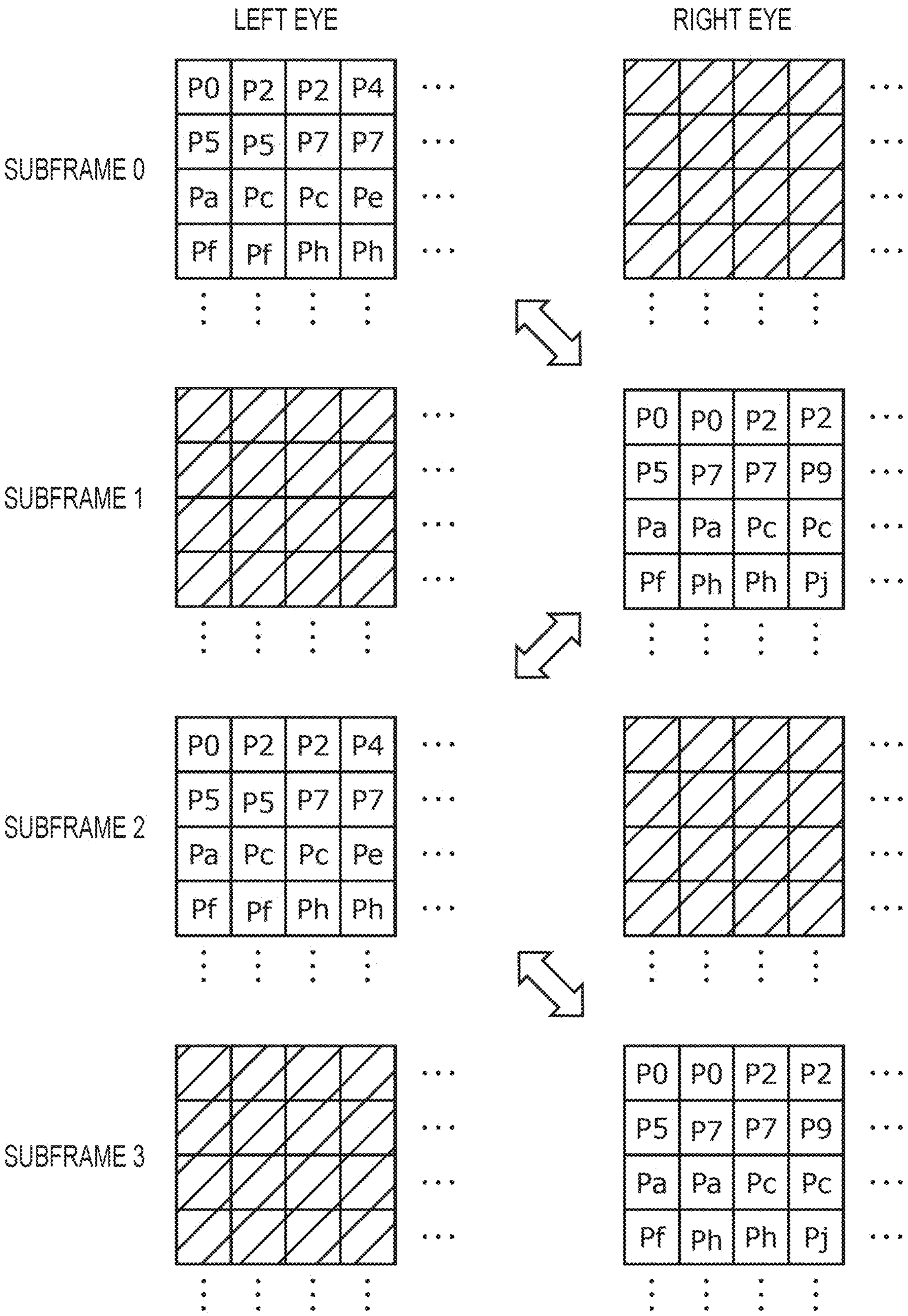
FIG. 21 is a diagram illustrating display according to an embodiment.
Figure 22:
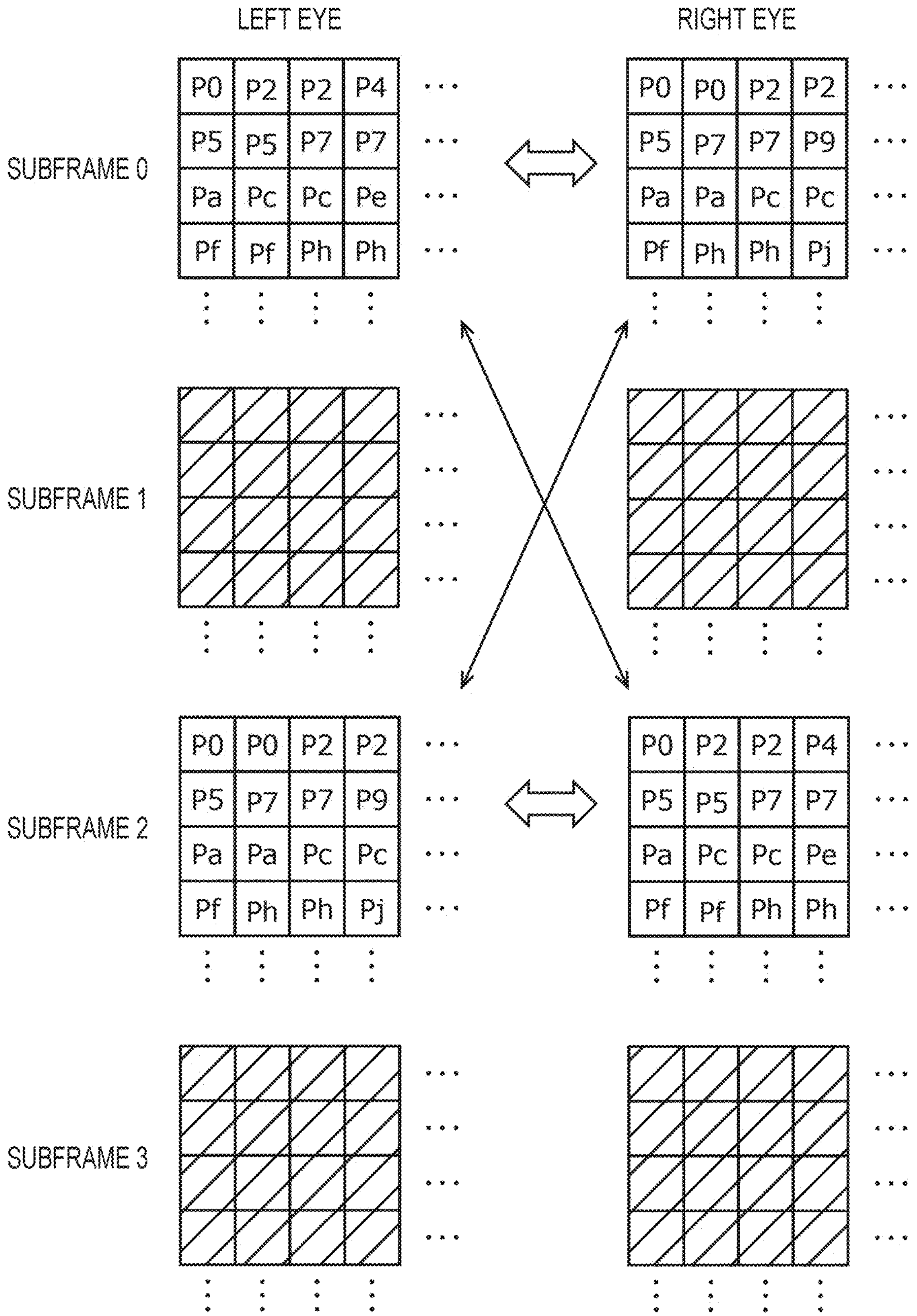
FIG. 22 is a diagram illustrating display according to an embodiment.

Black images may be temporally alternately inserted and displayed for the left eye and the right eye. FIG. 22 is a diagram illustrating an example in which a black image is displayed. As illustrated in FIG. 21, in the subframe 0, an image based on an input signal is displayed for the left eye, and a black image is displayed for the right eye, for example. In the next subframe 1, the black image is displayed for the left eye, and an image based on the input signal is displayed for the right eye.

With such display, a temporal decrease in resolution can be avoided. Furthermore, as transfer and processing are unnecessary at the timings of the black image, use of resources can be reduced.

Ninth Embodiment

FIG. 22 is a diagram illustrating another example in which a black image is inserted. As illustrated in FIG. 22, a black image may be inserted as images for the right and left eyes at the same timing. As the black image is inserted in this manner, it is possible to reduce the data transfer amount while enhancing moving image properties.

Tenth Embodiment

Figure 23:
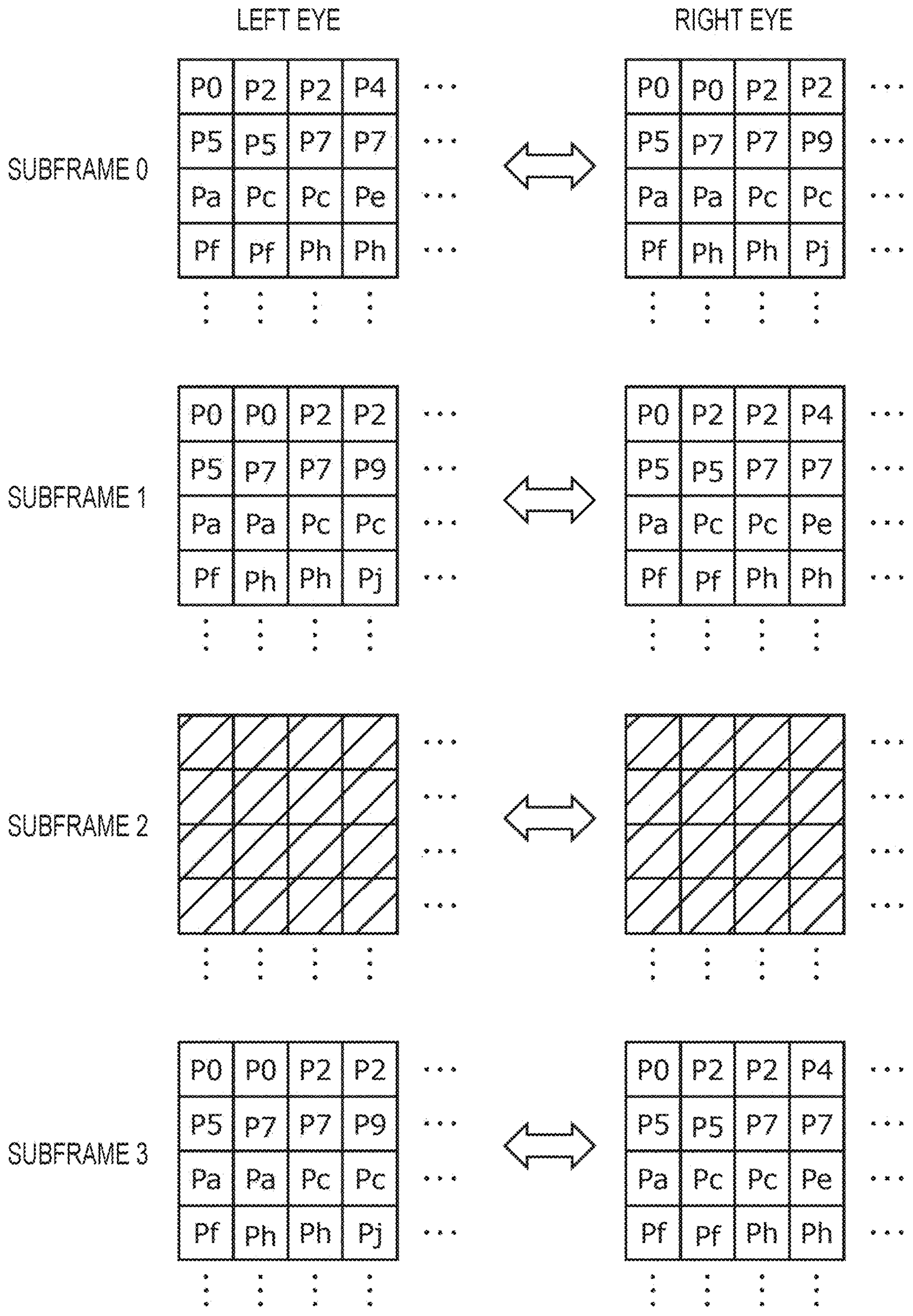
FIG. 23 is a diagram illustrating display according to an embodiment.

FIG. 23 is a diagram illustrating another example in which a black image is inserted. As illustrated in FIG. 23, a black image may be inserted as images for the right and left eyes at the same timing, but at a timing different from that shown in FIG. 22. For example, the black image may be inserted every two subframes. As such black image insertion is performed, it is possible to temporally and spatially avoid a decrease in resolution more effectively than in the ninth embodiment, and it is possible to enhance moving image properties.

Eleventh Embodiment

Figure 24:
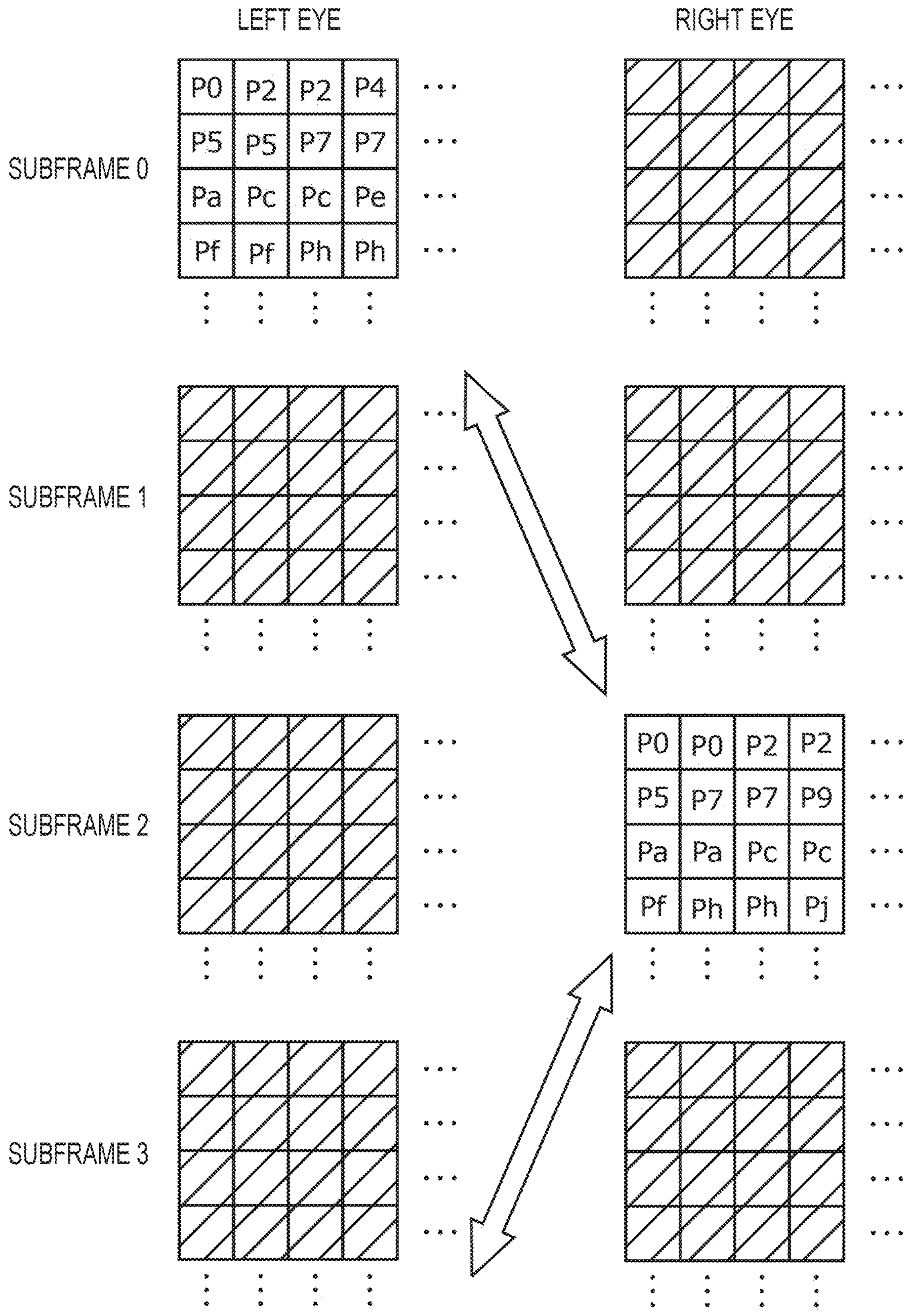
FIG. 24 is a diagram illustrating display according to an embodiment.

FIG. 24 is a diagram illustrating another example in which a black image is inserted. As illustrated in FIG. 24, an image corresponding to an input image may be displayed at different timings for the right and left eyes, and three subframes of a black image may be inserted between displays for one eye. This method is a combination of the display method illustrated in FIG. 21 and the display method illustrated in FIG. 22. As such display is performed, it is possible to further reduce the transfer data amount compared with that in FIGS. 21 and 22, while maintaining moving image properties.

Twelfth Embodiment

Figure 25:
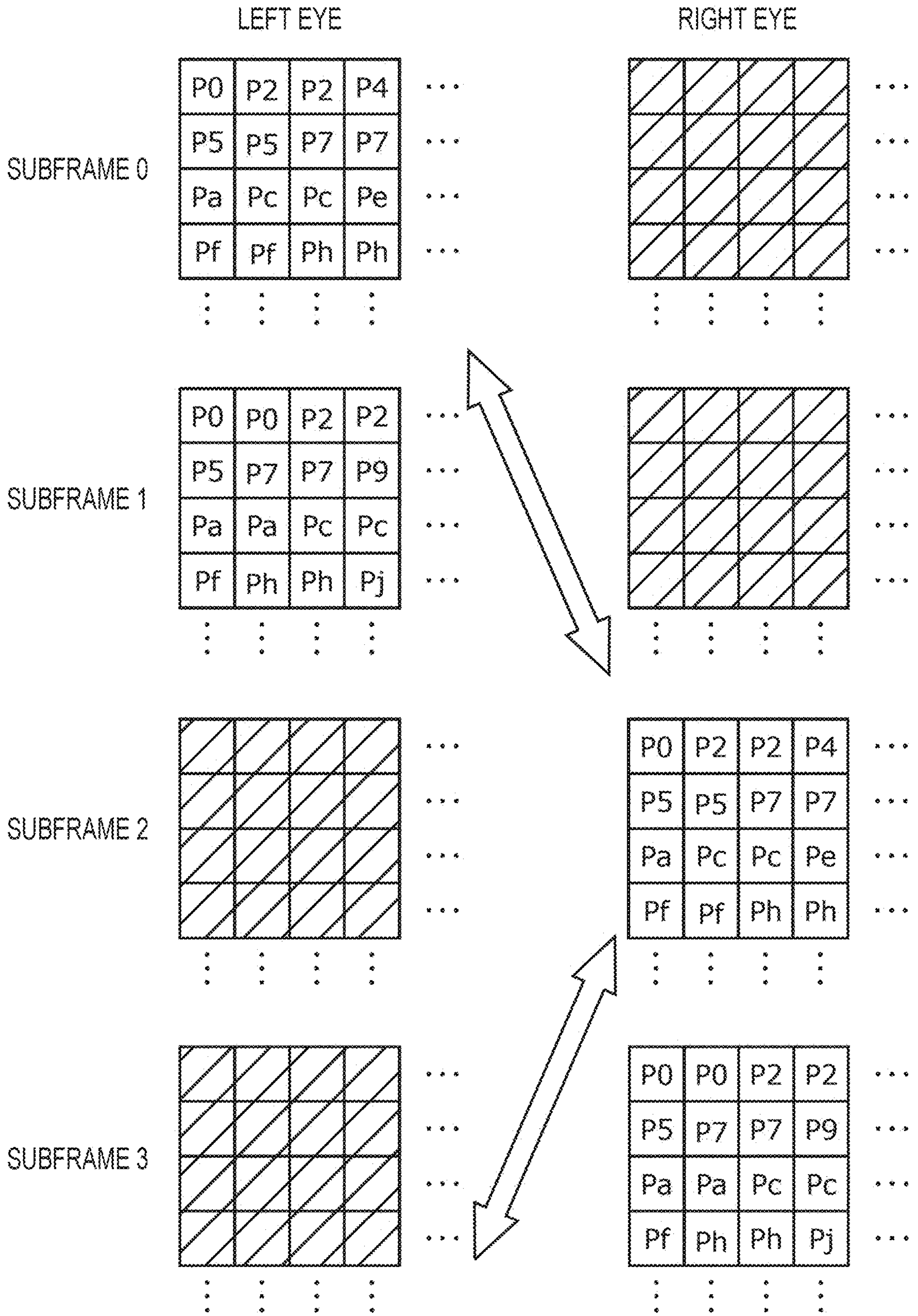
FIG. 25 is a diagram illustrating display according to an embodiment.

FIG. 25 is a diagram illustrating another example in which a black image is inserted. As illustrated in FIG. 25, the image corresponding to an input image is not switched between the right and the left for each subframe, but display may be switched every two subframes, for example. Such display makes it possible to temporally avoid a decrease in resolution.

Although the manners of displaying various pixel blocks have been described above, display according to the present disclosure can be implemented regardless of the pixel circuit, because the display can be processed on the control circuit side.

Figure 26:
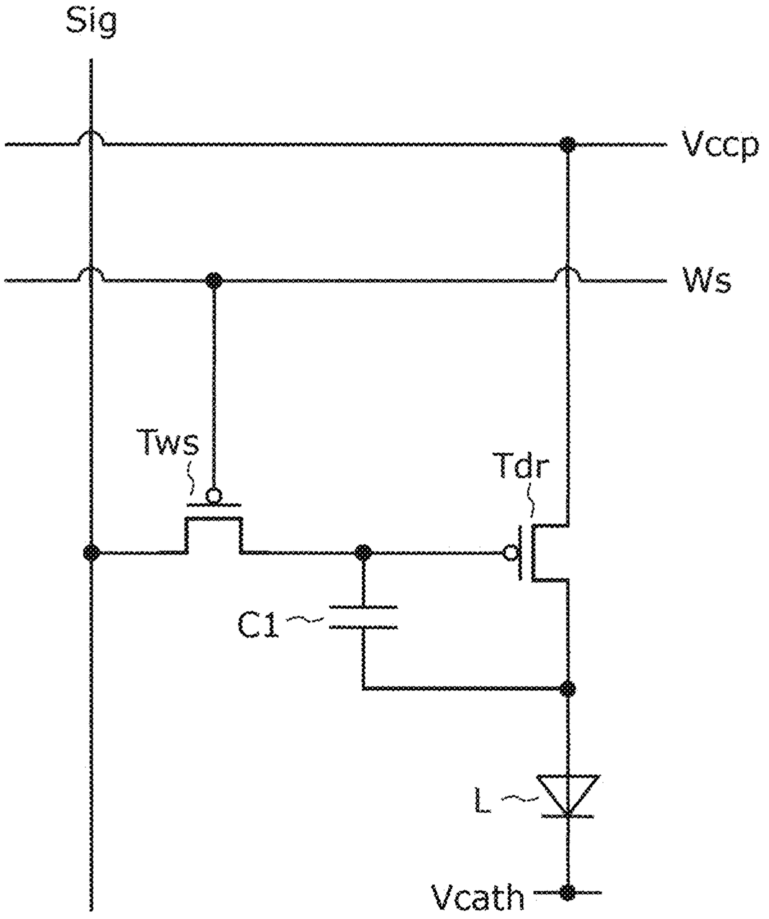
FIG. 26 is a diagram illustrating a pixel circuit according to an embodiment.

FIG. 26 is a diagram illustrating an example of a pixel circuit that outputs an analog signal to a pixel 120. FIG. 24 illustrates a pixel circuit having a very simple configuration. The pixel circuit includes transistors Tws and Tdr, a capacitor C1, and a light emitting element L.

The light emitting element L is an LED element such as an LED, an OLED, or an M-OLED, for example. In the following description, the light emitting element L is an element such as an LED or the like, but is not limited to these LEDs. A similar form can be applied as long as the light emitting element L is an element that emits light when a voltage is applied or when a current flows. The light emitting element L emits light when a current flows from the anode to the cathode. The cathode is connected to a reference voltage Vcath (for example, 0 V). The anode of the light emitting element L is connected to the drain of the transistor Tdr, and one terminal of the first capacitor C1.

The transistor Tws is a p-type MOSFET, for example, and is a transistor (a write transistor) that controls writing of a pixel value. In the transistor Tws, a signal Sig indicating a pixel value is input to the source, the drain is connected to the other end of the capacitor C1 and the gate of the transistor Tdr, and a signal Ws for write control is applied to the gate. The transistor Tws causes a drain current according to the signal Sig to flow with the signal Ws, and controls writing into the capacitor C1 and the gate potential of the transistor Tdr. When the transistor Tws is turned on, a voltage based on the magnitude of the signal Sig is charged (written) in the capacitor C1, and the emission intensity of the light emitting element L is controlled by the charge amount of the capacitor C1.

The transistor Tds is a p-type MOSFET, for example, and is a transistor that controls driving for applying a current based on the potential corresponding to the written pixel value to the light emitting element L. The transistor Tds is a transistor (drive transistor) that has a source connected to a power supply voltage Vccp for driving the MOS, a drain connected to the source of the transistor Tdr, and a gate to which a drive signal Ds is applied, and supplies a drive current to the light emitting element L. A drain current flows in accordance with the drive signal Ds, and the drain potential of the transistor Tdr is raised.

As a simple example, the pixel 120 emits light by performing writing based on the signal Sig for determining the emission intensity for each pixel and applying a drain current corresponding to the intensity of the written signal to the light emitting element L in this manner.

Figure 27:
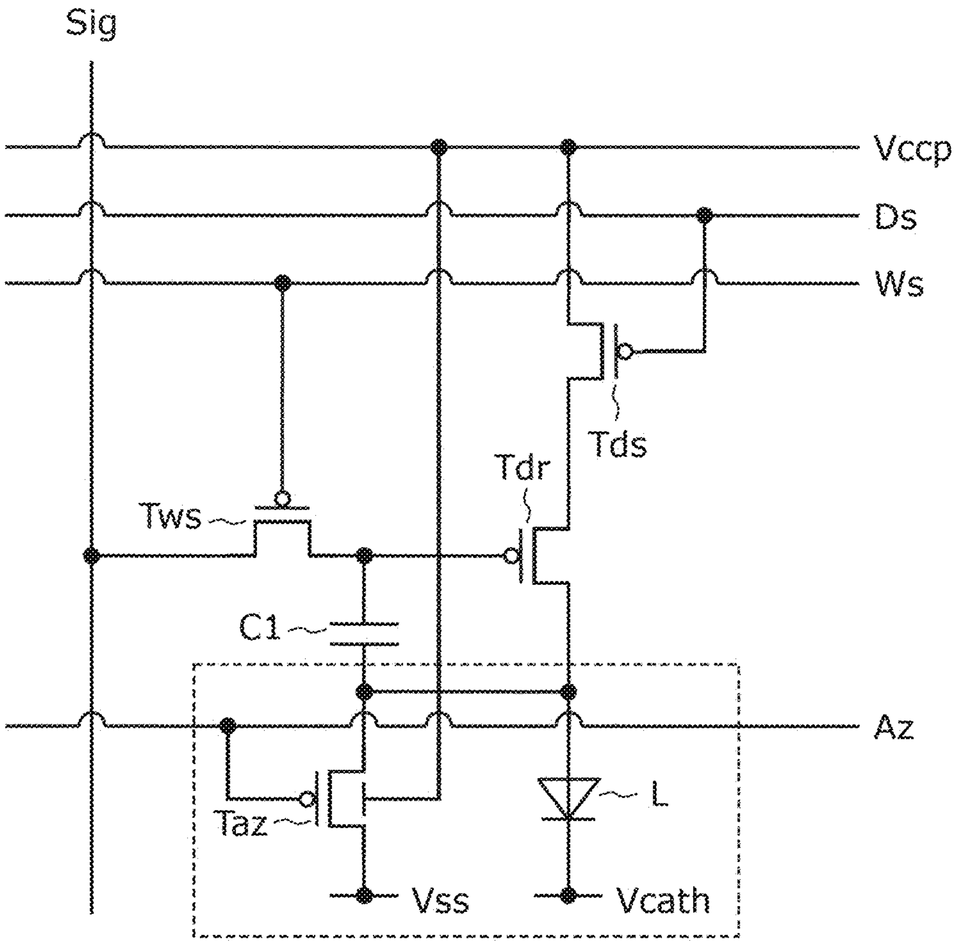
FIG. 27 is a diagram illustrating a pixel circuit according to an embodiment.

FIG. 27 is a diagram illustrating another example of a pixel circuit. As a general simple example, a pixel 120 may include a first transistor Taz, a second transistor Tws, a third transistor Tds, a fourth transistor Tdr, and a first capacitor C1.

The anode of the light emitting element L is connected to the source of the first transistor Taz, the drain of the fourth transistor Tdr, and one terminal of the first capacitor C1.

The first transistor Taz is a p-type MOSFET, for example, and has a source connected to the anode of the light emitting element L, a drain connected to a voltage Vss, and a gate to which a signal Az is applied. The first transistor Taz is a transistor that initializes the potential of the anode of the light emitting element L, in accordance with the signal Az. The voltage Vss is a reference voltage at the power supply voltage, for example, and may represent a grounded state or may be a potential of 0 V.

The first capacitor C1 is a capacitor for controlling the potential on the anode side of the light emitting element L.

The second transistor Tws is a p-type MOSFET, for example, and is a transistor that controls writing of a pixel value. In the second transistor Tws, the signal Sig indicating a pixel value is input to the source, the drain is connected to the other end of the first capacitor C1 and the gate of the fourth transistor Tdr, and the signal Ws for write control is applied to the gate. The second transistor Tws causes a drain current according to the signal Sig to flow with the signal Ws, and controls writing into the first capacitor C1 and the gate potential of the fourth transistor Tdr. When the second transistor Tws is turned on, a voltage based on the magnitude of the signal Sig is charged (written) in the first capacitor C1, and the emission intensity of the light emitting element L is controlled by the charge amount of the first capacitor C1.

The third transistor Tds is a p-type MOSFET, for example, and is a transistor that controls driving for applying a current based on the potential corresponding to the written pixel value to the light emitting element L. The third transistor Tds has a source connected to the power supply voltage Vccp for driving the MOS, a drain connected to the source of the fourth transistor Tdr, and a gate to which the drive signal Ds is applied. A drain current flows in accordance with the drive signal Ds, and the drain potential of the fourth transistor Tdr is raised.

The fourth transistor Tdr is a p-type MOSFET, for example, and applies a current based on the signal Sig written by the second transistor Tws to the light emitting element L, by driving the third transistor Tdr. The fourth transistor Tdr has a source connected to the drain of the third transistor Tds, a drain connected to the anode of the light emitting element L, and a gate connected to the drain of the second transistor Tws. In the fourth transistor Tdr, the signal Sig stored by the second transistor Tws and the first capacitor C1 is applied to the gate. Accordingly, the source potential becomes a sufficiently large value, and thus, the drain current corresponding to the signal Sig flows. When the drain current flows, the light emitting element L emits light with the intensity (luminance) corresponding to the signal Sig.

As a simple example, the pixel 120 emits light by performing writing based on the signal Sig for determining the emission intensity for each pixel and applying the drain current corresponding to the intensity of the written signal to the light emitting element L in this manner, as described above.

The first transistor Taz is a transistor that performs a quick discharge operation at a timing after light emission to initialize a written state. The body of the first transistor Taz needs to be held at a sufficiently large potential for appropriate driving while the pixel 120 operates (light emission, extinction), and the power supply voltage Vccp is applied, for example.

Since the first transistor Taz is off while the light emitting element L emits light, a voltage sufficiently higher than a threshold voltage is applied to the gate. In a case where the light emitting element L emits light, a voltage higher than the voltage Vccp is applied to the gate of the first transistor Taz, for example. As an example, the voltage Vccp is 9 V, and a voltage of 10 V is applied to the first transistor Taz in the light emitting state.

On the other hand, while the light emitting element L is quenched, there is a timing at which the first transistor Taz is turned on to discharge the written charge. At this timing for turning on the first transistor Taz, the gate of the first transistor Taz is desirably set to a potential sufficiently lower than the threshold voltage. For example, a voltage (for example, 0 V) equal to the voltage Vss is applied to the gate of the first transistor Taz.

In this case, in the first transistor Taz, a voltage of 9 V is applied to the body, and a voltage of 0 V is applied to the gate, for example. Therefore, there is a possibility that the time during which a high voltage is applied between the body and the gate of the first transistor Taz will be long. The longer this time, the higher the possibility that the life of the first transistor Taz becomes shorter, and the performance is degraded. As the performance of the first transistor Taz is degraded, appropriate charging and discharging cannot be performed in the pixel 120 is some cases. In the present disclosure, the discharge timing of the first transistor Taz may be appropriately controlled.

Figure 28:
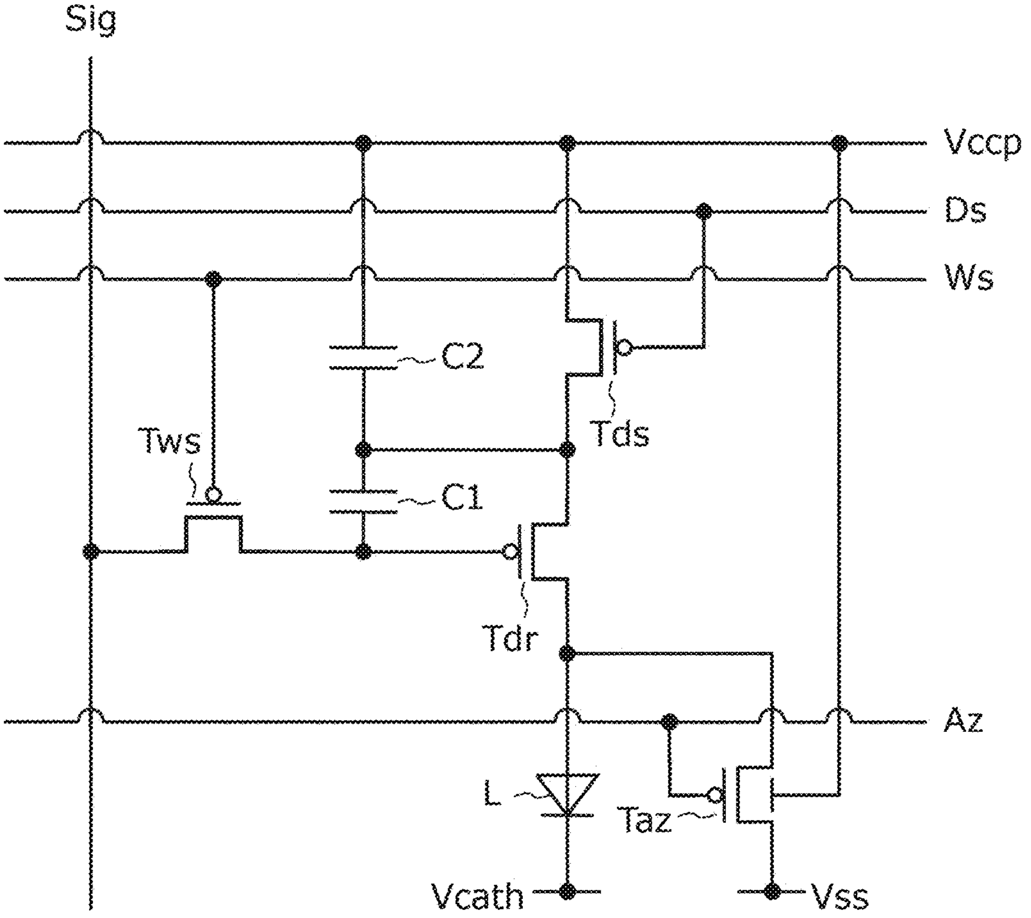
FIG. 28 is a diagram illustrating a pixel circuit according to an embodiment.

FIG. 28 is a diagram illustrating another example of a pixel 120. Although the configuration includes four transistors and one capacitor in FIG. 27, the pixel 120 includes four transistors and two capacitors in FIG. 28.

A second capacitor C2 is a capacitor for charging the voltage corresponding to the signal Sig on the basis of the write signal Ws, together with the first capacitor C1. In this manner, even if the number of capacitors is changed, the potential of the anode of the light emitting element L is controlled by the first transistor Taz, to appropriately perform a quenching operation.

Figure 29:
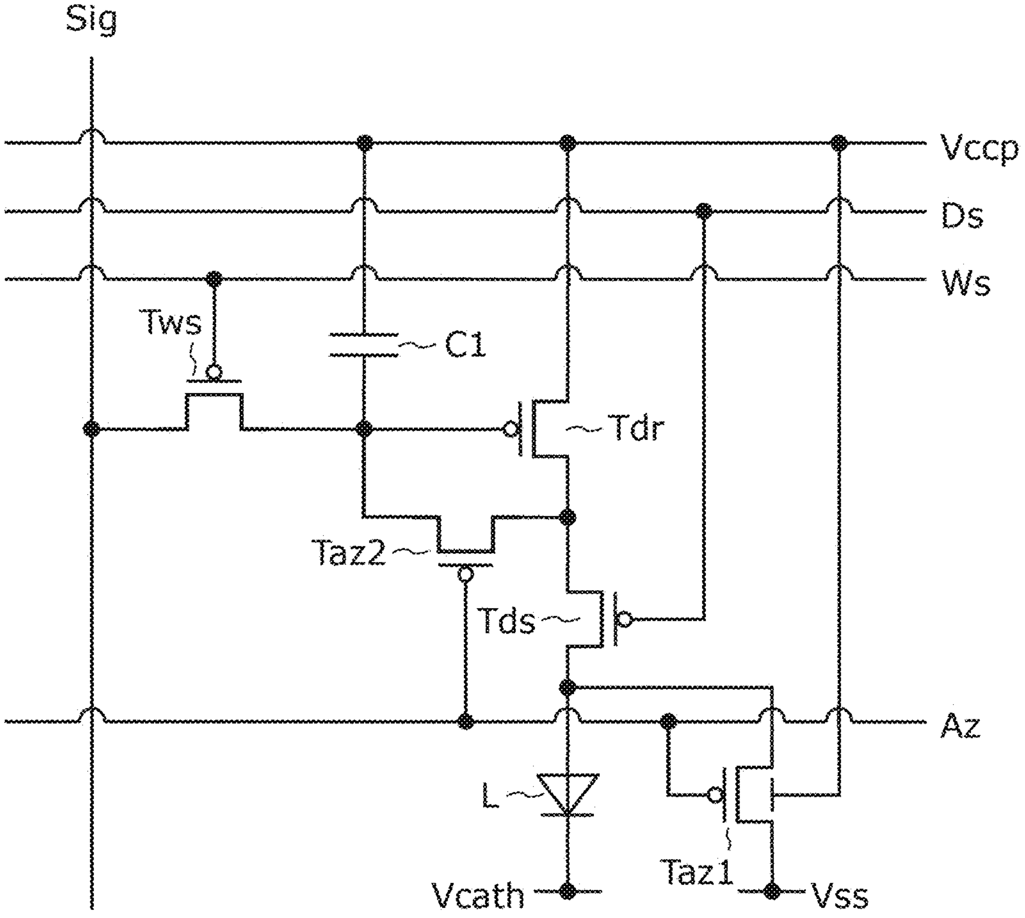
FIG. 29 is a diagram illustrating a pixel circuit according to an embodiment.

FIG. 29 is a diagram illustrating another example of a pixel 120. In FIG. 29, Taz1 and Taz2 are included as initialization transistors. In such a mode, a voltage similar to that in each of the modes described above is also applied to Taz1. Furthermore, a similar voltage may also be applied to Taz2 at the same timing.

As described above, by performing control in a similar manner in a case where a plurality of initialization transistors is present, it is possible to shorten the time during which a high potential is applied between the bodies and the gates of the initialization transistors.

Figure 30:
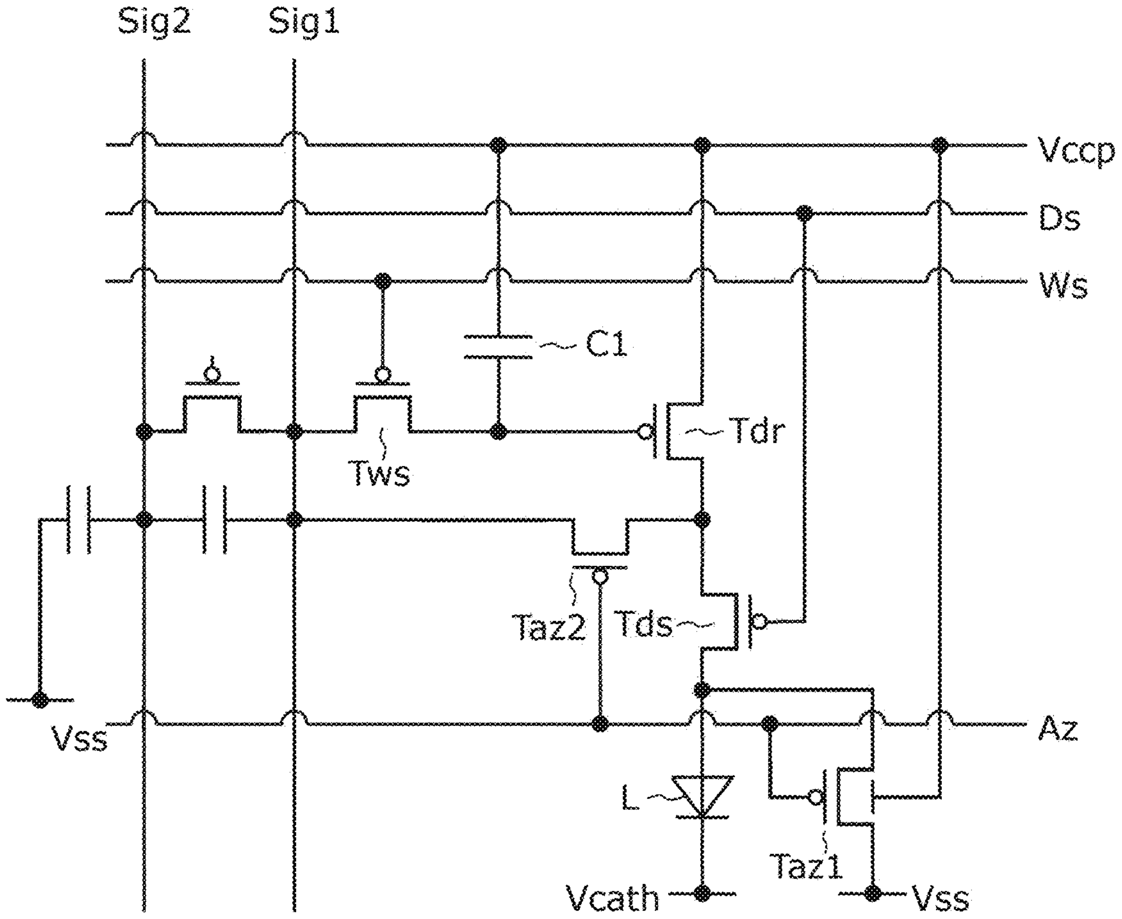
FIG. 30 is a diagram illustrating a pixel circuit according to an embodiment.

FIG. 30 is a diagram illustrating another example of a pixel 120. As illustrated in FIG. 30, in a case where there are two kinds of signals indicating the intensity of the pixel, which are Sig1 and Sig2, similar control can be performed for the initialization transistors Taz1 and Taz2.

Figure 31:
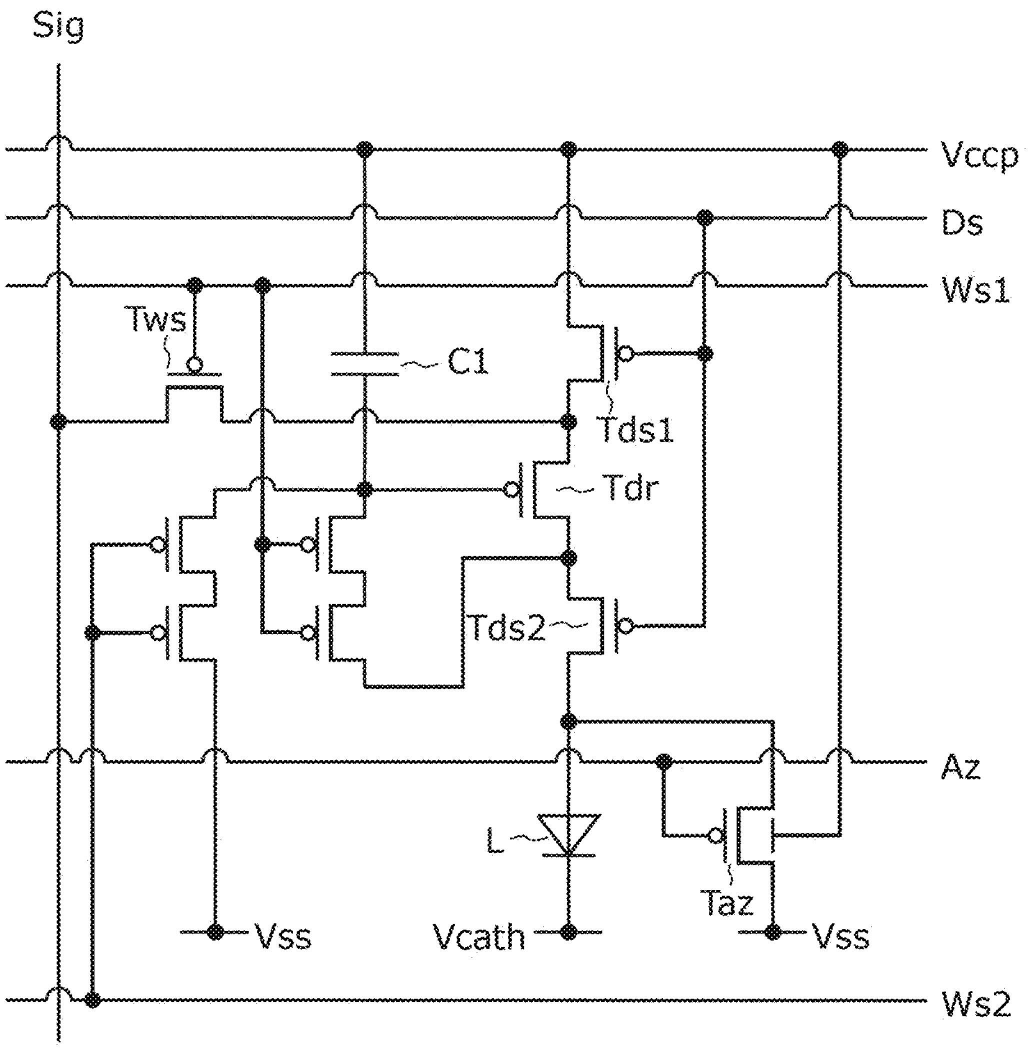
FIG. 31 is a diagram illustrating a pixel circuit according to an embodiment.

FIG. 31 is a diagram illustrating another example of a pixel 120. The pixel 120 is controlled with Ws2 as an offset, which is a signal for performing write control on a previous line scanned first, in addition to Ws1, which is a signal for performing write control on the pixel. In such a mode that depends on control by another line, the present disclosure can also be appropriately applied. Further, to stabilize charging, the pixel 120 includes a write transistor that uses an offset and assists the second transistor Tws.

Figure 32:
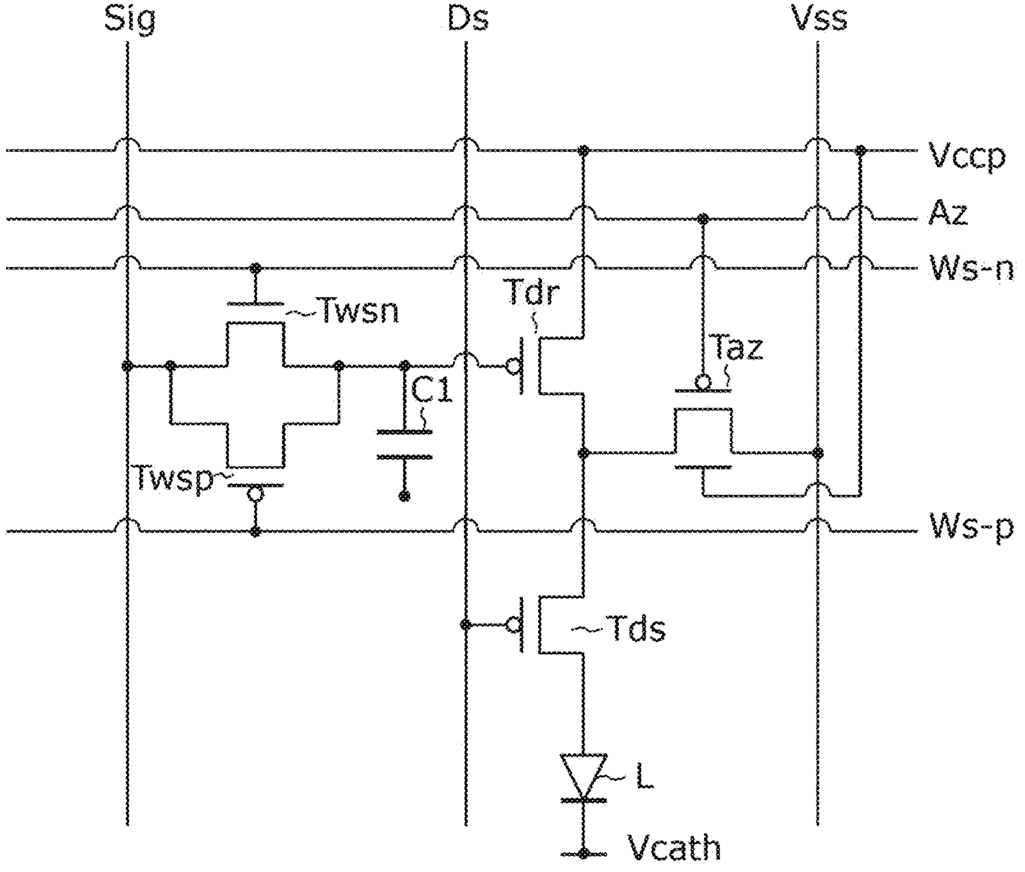
FIG. 32 is a diagram illustrating a pixel circuit according to an embodiment.

FIG. 32 is a diagram illustrating another example of a pixel 120. To control Ws in a complementary manner, the pixel 120 includes transistors Tws_n and Tws_p, instead of the second transistor Tws. In such a configuration, control according to the present disclosure can also be adopted.

Note that, in the above description, only the relevant components of the present disclosure have been explained with respect to appropriate components such as other circuits necessary for display, but the display device 1 appropriately includes components (not illustrated) necessary for displaying a video image or the like, in addition to the relevant components.

All the embodiments described above can be implemented by performing pulse control on reading from the first latches to the second latches, and disposing a selector at the stage subsequent to the second latches.

Application Examples of the Display Device 1 According to the Present Disclosure

First Application Example

Figure 33A:
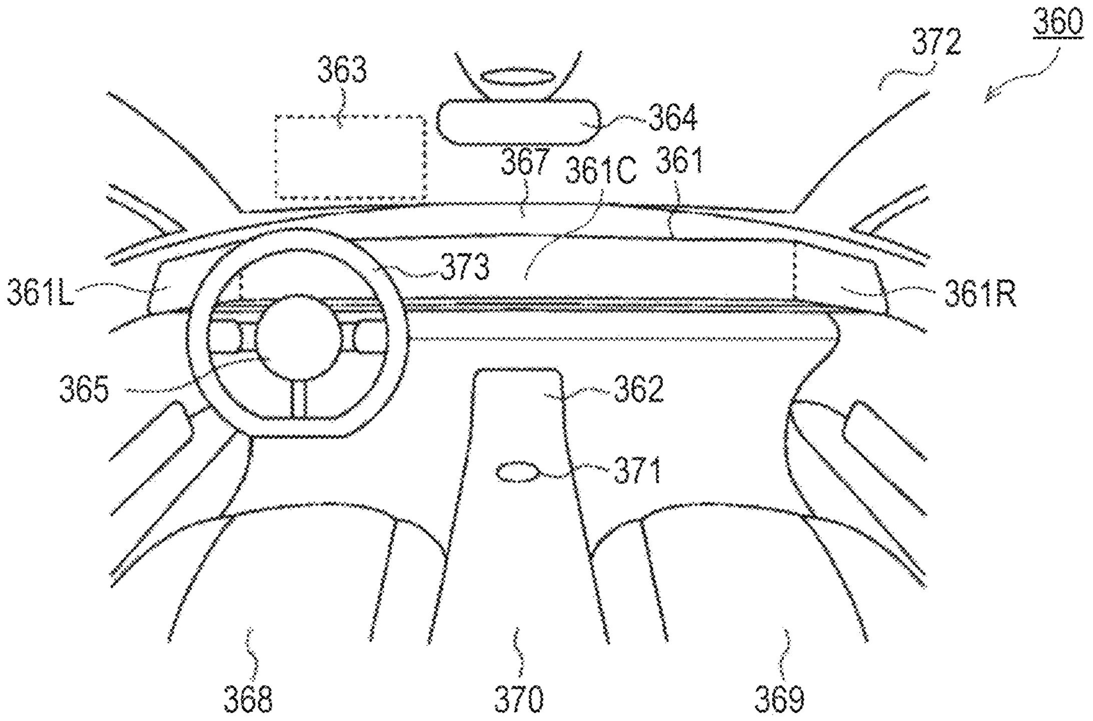
FIG. 33A is a view illustrating an internal state of a vehicle as viewed from the rear side to the front side of the vehicle.
Figure 33B:
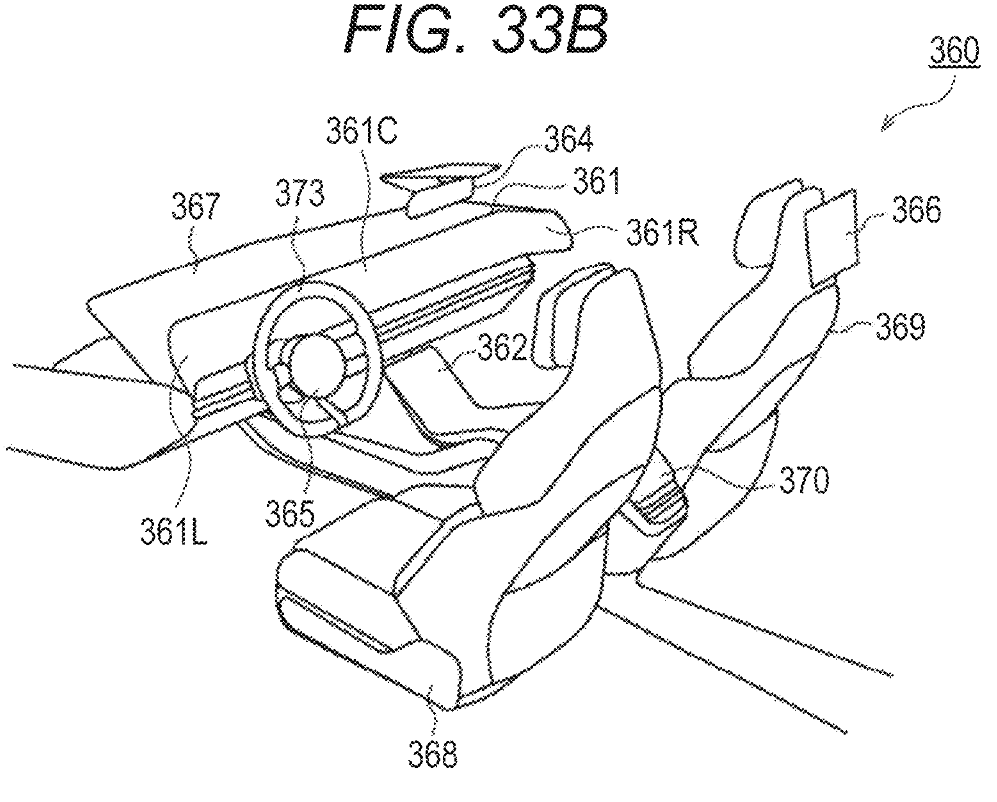
FIG. 33B is a view illustrating an internal state of the vehicle as viewed obliquely from the rear side to the front side of the vehicle.

The display device 1 according to the present disclosure can be used for various applications. FIGS. 33A and 33B are views illustrating an internal configuration of a vehicle 360 as a first application example of the display device 1 according to the present disclosure. FIG. 33A is a view illustrating an internal state of the vehicle 360 as viewed from the rear side to the front side of the vehicle 360. FIG. 33B is a view illustrating an internal state of the vehicle 360 as viewed obliquely from the rear side to the front side of the vehicle 360.

The vehicle 360 in FIGS. 33A and 33B includes a center display 361, a console display 362, a head-up display 363, a digital rearview mirror 364, a steering wheel display 365, and a rear entertainment display 366.

The center display 361 is disposed on a dashboard 367 at a location facing a driver's seat 368 and a passenger seat 369. FIG. 33 illustrates an example of the center display 361 having a horizontally long shape extending from the side of the driver's seat 368 to the side of the passenger seat 369, but any screen size and arrangement location of the center display 361 may be adopted. The center display 361 can display information sensed by various sensors. As a specific example, the center display 361 can display an image captured by an image sensor, an image of the distance to an obstacle in front of or on a side of the vehicle, the distance being measured by a ToF sensor, a passenger's body temperature detected by an infrared sensor, and the like. The center display 361 can be used to display, for example, at least one piece of safety-related information, operation-related information, a lifelog, health-related information, authentication/identification-related information, or entertainment-related information.

The safety-related information is information of doze sensing, looking-away sensing, sensing of mischief of a child riding together, presence or absence of wearing of a seat belt, sensing of leaving of an occupant, and the like, and is information sensed by the sensor arranged to overlap with a back surface side of the center display 361, for example. The operation-related information senses a gesture related to an operation by an occupant, using a sensor. Gestures to be sensed may include an operation of various kinds of equipment in the vehicle 360. For example, operations of air conditioning equipment, a navigation device, an AV device, a lighting device, and the like are detected. The lifelog includes lifelogs of all the occupants. For example, the lifelog includes an action record of each occupant in the vehicle. By acquiring and storing the lifelog, it is possible to check the state of the occupant at the time of an accident. The health-related information senses the body temperature of an occupant, using a temperature sensor, and estimates the health condition of the occupant on the basis of the sensed body temperature. Alternatively, the face of the occupant may be imaged with an image sensor, and the health condition of the occupant may be estimated from the imaged facial expression. Further, a conversation may be made with the occupant in automatic voice, and the health condition of the occupant may be estimated on the basis of the contents of an answer from the occupant. The authentication/identification-related information includes a keyless entry function of performing face authentication using a sensor, and a function of automatically adjusting a seat height and position through face identification. The entertainment-related information includes a function of detecting, with a sensor, operation information about an audiovisual (AV) device being used by the occupant, and a function of recognizing the face of the occupant with sensor and providing content suitable for the occupant through the AV device.

The console display 362 can be used to display lifelog information, for example. The console display 362 is disposed near a shift lever 371 of a center console 370 between the driver's seat 368 and the passenger seat 369. The console display 362 can also display information detected by various sensors. Furthermore, the console display 362 may display an image of the surroundings of the vehicle captured with an image sensor, or may display an image of the distance to an obstacle in the surroundings of the vehicle.

The head-up display 363 is virtually displayed behind a windshield 372 in front of the driver's seat 368. The head-up display 363 can be used to display at least one piece of the safety-related information, the operation-related information, the lifelog, the health-related information, the authentication/identification-related information, or the entertainment-related information, for example. Being virtually disposed in front of the driver's seat 368 in many cases, the head-up display 363 is suitable for displaying information directly related to operations of the vehicle 360, such as the speed, the remaining amount of fuel (battery), and the like of the vehicle 360.

The digital rearview mirror 364 can not only display the rear of the vehicle 360 but also display the state of an occupant in the rear seat, and thus, can be used to display the lifelog information by disposing a sensor on the back surface side of the digital rearview mirror 364 in an overlapping manner, for example.

The steering wheel display 365 is disposed near the center of a steering wheel 373 of the vehicle 360. The steering wheel display 365 can be used to display at least one piece of the safety-related information, the operation-related information, the lifelog, the health-related information, the authentication/identification-related information, or the entertainment-related information, for example. In particular, being located close to the driver's hands, the steering wheel display 365 is suitable for displaying the lifelog information such as the body temperature of the driver, or for displaying information regarding operations of the AV device, the air conditioning equipment, or the like.

The rear entertainment display 366 is attached to the back side of the driver's seat 368 or the passenger seat 369, and is an occupant in the rear seat to enjoy viewing/listening. The rear entertainment display 366 can be used to display at least one piece of the safety-related information, the operation-related information, the lifelog, the health-related information, the authentication/identification-related information, or the entertainment-related information, for example. In particular, as the rear entertainment display 366 is located in front of the occupant in the rear seat, information related to the occupant in the rear seat is displayed. For example, information regarding an operation of the AV device or the air conditioning equipment may be displayed, or a result of measurement of the body temperature or the like of the occupant in the rear seat with a temperature sensor may be displayed.

As described above, disposing a sensor on the back surface side of the display device 1 makes it possible to measure the distance to an object existing in the surroundings. Optical distance measurement methods are roughly classified into a passive type and an active type. By a method of the passive type, distance measurement is performed by receiving light from an object, without projecting light from a sensor to the object. Methods of the passive type include a lens focus method, a stereo method, and a monocular vision method. Methods of the active type include distance measurement that is performed by projecting light onto an object, and receiving reflected light from the object with a sensor to measure the distance. Methods of the active type include an optical radar method, an active stereo method, an illuminance difference stereo method, a moire topography method, and an interference method. The display device 1 according to the present disclosure can be used in distance measurement by any of these methods. With a sensor disposed on the back surface side of the display device 1 according to the present disclosure in an overlapping manner, distance measurement of the passive type or the active type described above can be performed.

Second Application Example

The display device 1 according to the present disclosure can be applied not only to various displays used in vehicles but also to displays mounted on various electronic apparatuses.

Figure 34A:
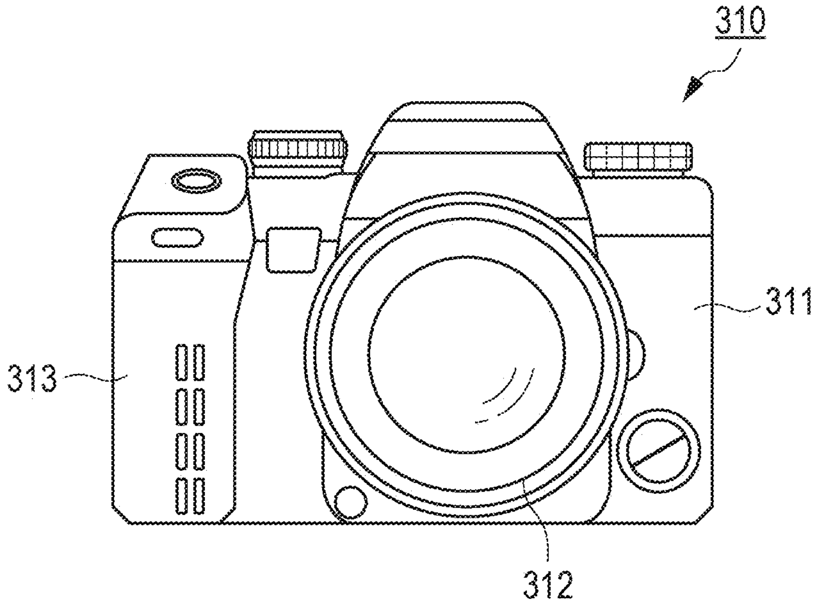
FIG. 34A is a front view of a digital camera as a second application example of an electronic apparatus.
Figure 34B:
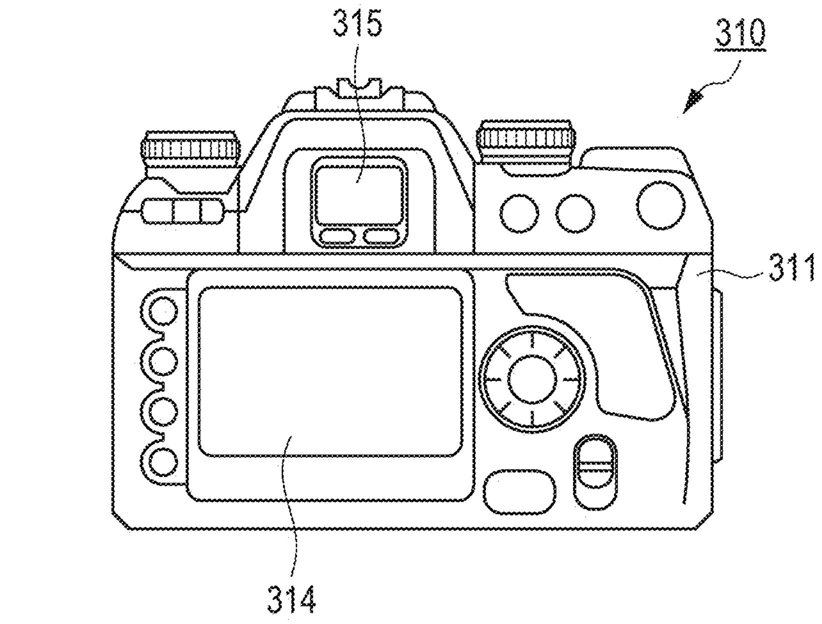
FIG. 34B is a rear view of the digital camera.

FIG. 34A is a front view of a digital camera 310 as a second application example of the display device 1. FIG. 34B is a rear view of the digital camera 310. The digital camera 310 in FIGS. 34A and 34B is an example of a single-lens reflex camera in which a lens 121 is replaceable, but the display device 1 can also be applied to a camera in which the lens 121 is not replaceable.

In the camera in FIGS. 34A and 34B, when a person who captures an image looks into an electronic viewfinder 315 to determine a composition while holding a grip 313 of a camera body 311, and presses a shutter while adjusting focus, captured image data is stored into a memory in the camera. As illustrated in FIG. 34B, a monitor screen 316 that displays the captured image data or the like and a live image or the like, and the electronic viewfinder 315 are disposed on the back surface side of the camera. Furthermore, there is a case where a sub screen that displays setting information such as a shutter speed and an exposure value is disposed on the upper surface of the camera.

By disposing a sensor, in an overlapping manner, on the back surface side of the monitor screen 316, the electronic viewfinder 315, the sub screen, and the like that are used for the camera, the camera can be used as the display device 1 according to the present disclosure.

Third Application Example

The display device 1 according to the present disclosure can also be applied to a head-mounted display (hereinafter referred to as an HMD). An EMD can be used for VR, AR, mixed reality (MR), substitutional reality (SR), or the like.

Figure 35A:
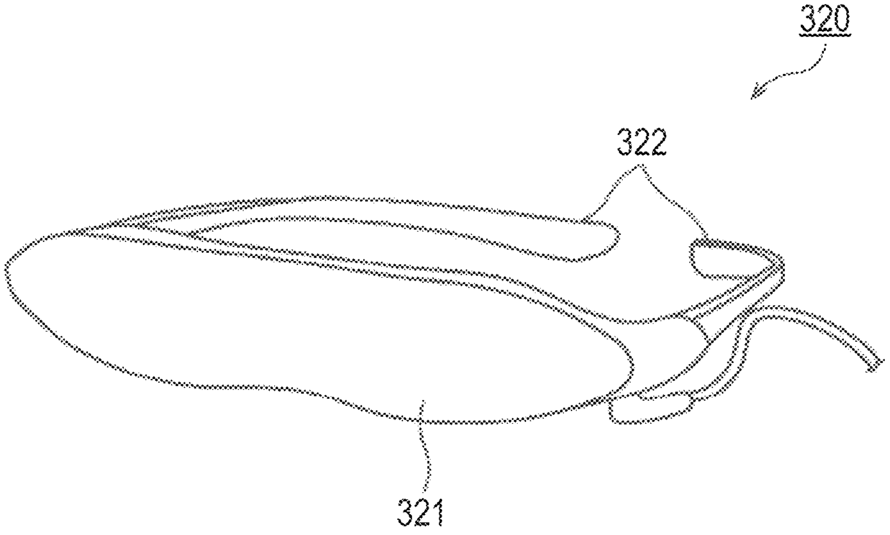
FIG. 35A is an external view of an HMD as a third application example of an electronic apparatus.

FIG. 35A is an external view of an HMD 320 as a third application example of the display device 1. The HMD 320 in FIG. 35A includes attachment members 322 for attachment to cover human eyes. The attachment members 322 are hooked and secured to human ears, for example. A display device 321 is provided inside the HMD 320, and the wearer of the HMD 320 can visually recognize a stereoscopic image and the like with the display device 321. The HMD 320 includes a wireless communication function and an acceleration sensor, for example, and can switch stereoscopic images or the like displayed on the display device 321 in accordance with a posture, a gesture, or the like of the wearer.

Furthermore, a camera may be disposed in the HMD 320 to capture an image around the wearer, and an image obtained by combining the image captured by the camera with an image generated by a computer may be displayed on the display device 321. For example, the camera is disposed to overlap with the back surface side of the display device 321 visually recognized by the wearer of the HMD 320, an image of the surroundings of the eyes of the wearer is captured with the camera, and the captured image is displayed on another display provided on the outer surface of the HMD 320, so that a person around the wearer can recognize the expression of the face and the movement of the eyes of the wearer in real time.

Figure 35B:
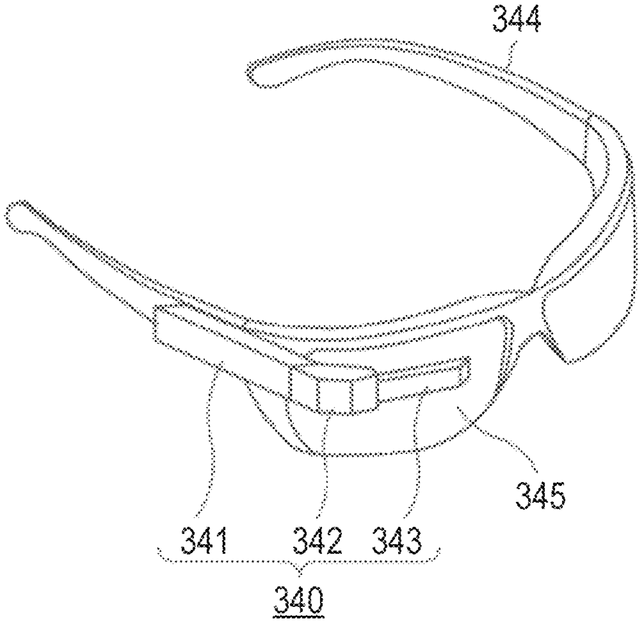
FIG. 35B is an external view of smart glasses.

Note that various kinds of HMD 320 are conceivable. For example, as illustrated in FIG. 35B, the display device 1 according to the present disclosure can also be applied to smart glasses 340 that display various kinds of information on glasses 344. The smart glasses 340 in FIG. 35B includes a main body portion 341, an arm portion 342, and a lens barrel portion 343. The main body portion 341 is connected to the arm portion 342. The main body portion 341 is detachable from the glasses 344. The main body portion 341 includes a display unit and a control board for controlling operations of the smart glasses 340. The main body portion 341 and the lens barrel are connected to each other via the arm portion 342. The lens barrel portion 343 emits image light emitted from the main body portion 341 through the arm portion 342, to the side of lenses 345 of the glasses 344. This image light enters the human eyes through the lenses 345. The wearer of the smart glasses 340 in FIG. 35B can visually recognize not only a surrounding situation but also various pieces of information emitted from the lens barrel portion 343, as with conventional glasses.

Fourth Application Example

The display device 1 according to the present disclosure can also be applied to a television device (hereinafter referred to as a TV). In a today's TV, the frame tends to be as small as small, from the viewpoint of downsizing and design. Therefore, in a case where a camera to capture an image of a viewer is disposed on a TV, it is desirable to disposed the camera so as to overlap with the back surface side of a display panel 331 of the TV.

Figure 36:
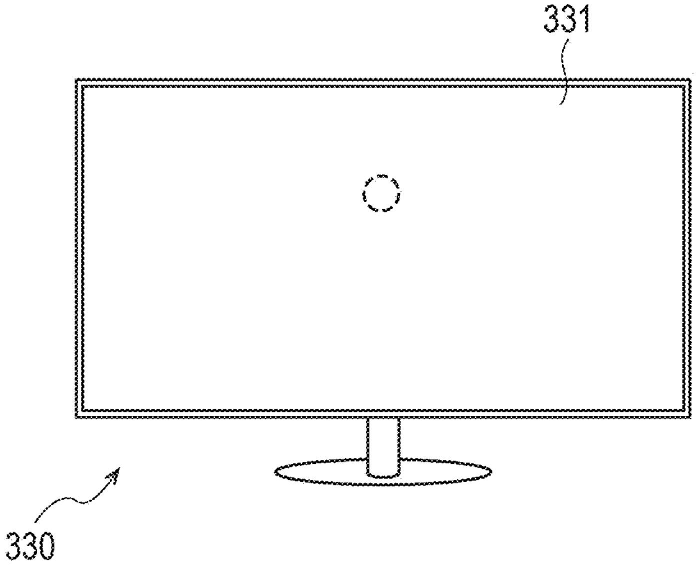
FIG. 36 is an external view of a television (TV) as a fourth application example of an electronic apparatus.

FIG. 36 is an external view of a TV 330 as a fourth application example of the display device 1. In the TV 330 in FIG. 36, the frame is minimized, and almost the entire region on the front side is the display area. The TV 330 includes a sensor such as a camera to capture an image of the viewer. The sensor in FIG. 36 is disposed on the back side of a portion (indicated by a dashed line, for example) in the display panel 331. The sensor may be an image sensor module, or various sensors can be used such as a sensor for face authentication, a sensor for distance measurement, and a temperature sensor. A plurality of kinds of sensors may be disposed on the back surface side of the display panel 331 of the TV 330.

As described above, with the display device 1 of the present disclosure, an image sensor module can be disposed to overlap with the back surface side of the display panel 331. Accordingly, there is no need to dispose a camera or the like on the frame, the TV 330 can be downsized, and there is no possibility that the design is impaired by the frame.

Fifth Application Example

The display device 1 according to the present disclosure can also be applied to a smartphone and a mobile phone.

Figure 37:
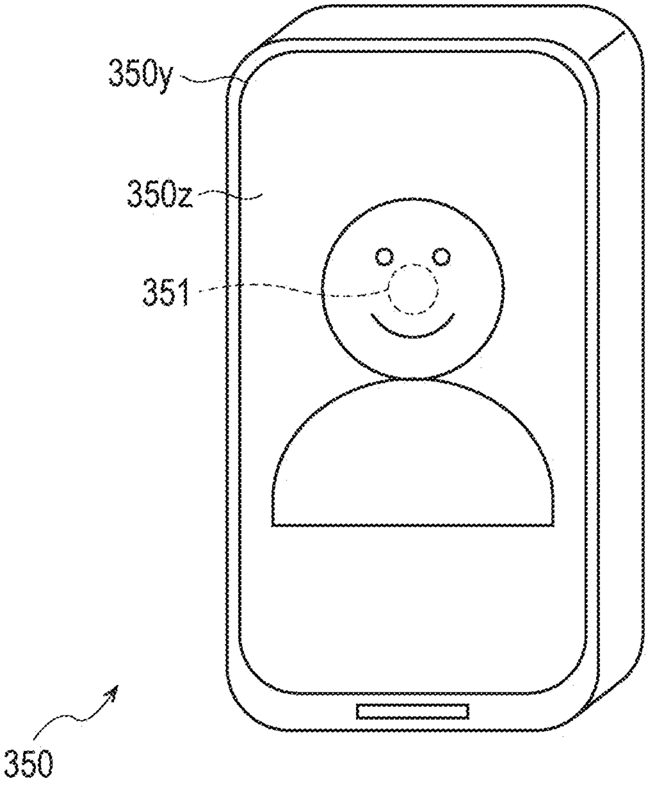
FIG. 37 is an external view of a smartphone as a fifth application example of an electronic apparatus.

FIG. 37 is an external view of a smartphone 350 as a fifth application example of the display device 1. In an example in FIG. 37, a display surface 350*z* covers nearly the outer shape size of the display device 1, and the width of a bezel 350*y* around the display surface 350*z* is set to several millimeters or smaller. In general, a front camera is often mounted on the bezel 350*y*. In FIG. 37, however, as indicated by a dashed line, an image sensor module 351 serving as the front camera is disposed on the back surface side of a substantially central portion of the display surface 2*z*, for example. As the front camera is disposed on the back surface side of the display surface 2*z* in this manner, there is no need to disposed the front camera on the bezel 350*y*, and thus, the width of the bezel 350*y* can be narrowed.

The embodiments described above may have the following modes.

(1)

A display device including:

a plurality of pixels arranged in a two-dimensional array in a first direction and a second direction intersecting the first direction;

a plurality of control lines extending in the first direction;

a plurality of data lines extending in the second direction;

a first control unit that supplies a control signal to the plurality of control lines; and a second control unit that supplies an image signal to the plurality of data lines, in which the plurality of pixels includes a first subpixel that emits light of a first color, a second subpixel that emits light of a second color, and a third subpixel that emits light of a third color, the first subpixel, the second subpixel, and the third subpixel include:

a light emitting element;

a capacitor;

a write transistor that supplies the image signal supplied to a corresponding data line among the plurality of data lines, to the capacitor, on the basis of the control signal supplied to a corresponding control line among the plurality of control lines; and a drive transistor that supplies a drive current corresponding to voltage accumulated in the capacitor, to the light emitting element, and the second control unit supplies the same image signal to two data lines corresponding to two of the first subpixels provided in two pixels adjacent to each other in the first direction among the plurality of data lines.

(2)

The display device of (1), in which the second control unit supplies the same image signal to the two data lines in the ith (i being an integer) horizontal period and the (i+n)th (n being an integer) horizontal period.

(3)

The display device of (2), in which the second control unit supplies the same image signal to the two data lines in the ith horizontal period and the (i+n)th horizontal period in different frames.

(4)

The display device of (2), in which every predetermined frame, the second control unit changes the two data lines to which the same image signal is supplied in the ith horizontal period and the (i+n)th horizontal period.

(5)

The display device of (4), in which in the (i+m)th (m being an integer that satisfies m<n) horizontal period and the (i+m+n)th horizontal period, the second control unit supplies the same image signal to the two data lines to which the same image signal is supplied in the ith horizontal period and the (i+n)th horizontal period.

(6)

The display device of (4), in which in the (i+m)th (m being an integer that satisfies m<n) horizontal period and the (i+m+n)th horizontal period, the second control unit supplies the same image signal to two data lines from which at least one of the two data lines to which the same image signal is supplied in the ith horizontal period and the (i+n)th horizontal period differs.

(7)

The display device of (1), in which the second control unit includes:

a first latch that stores the image signal;

a second latch that stores a signal supplied from the first latch, and outputs the stored signal on the basis of a synchronization signal in a horizontal direction; and a selector that multiplexes signals supplied from a plurality of the second latches, selects one of the multiplexed signals, and supplies the selected signal to the plurality of pixels.

(8)

The display device of (1), in which the pixel includes the subpixels that emit at least three primary colors of RGB, and, in the pixels adjacent to each other in the second direction, the second control unit causes the subpixels emitting R to emit light with the same intensity, and causes the subpixels emitting B to emit light with the same intensity.

(9)

The display device of (8), in which in the adjacent pixels that cause the subpixels emitting R and B to emit light with the same intensity, the second control unit causes the subpixels emitting G to emit light with the same intensity.

(10)

The display device of (8), in which in the adjacent pixels that cause the subpixels emitting R and B to emit light with the same intensity, the second control unit causes the subpixels emitting G to emit light with respective intensities based on the image signals for the respective pixels.

(11)

The display device of (1), in which the second control unit performs display by a doubler process in the first direction.

(12)

The display device of (1), in which the second control unit performs display by a binning process in the first direction.

(13)

The display device of (1), in which the second control unit performs display by a doubler process in the first direction and the second direction.

(14)

The display device of (1), in which the second control unit performs display by a binning process in the first direction and the second direction.

(15)

An electronic apparatus including:

a first display device that displays an image to be visually recognized with one eye; and a second display device that displays an image to be visually recognized with another eye, each of the first display device and the second display device being the display device of any one of (1) to (14), in which the image displayed on the first display device and the image displayed on the second display device are images having parallax for both eyes.

(16)

The electronic apparatus of (15), in which a combination of the two signal lines of the first display device and a combination of the two signal lines of the second display device are the same combinations in the same frame.

(17)

The electronic apparatus of (15), in which a combination of the two signal lines of the first display device and a combination of the two signal lines of the second display device are different combinations in the same frame.

(18)

The electronic apparatus of any one of (15) to (18), in which an image is not displayed on the second display device at a time when an image is displayed on the first display device, and an image is not displayed on the first display device at a time when an image is displayed on the second display device.

(19)

The electronic apparatus of any one of (15) to (18), in which the first display device and the second display device have the same frames in which images are not displayed.

Aspects of the present disclosure are not limited to the above-described embodiments, and include various conceivable modifications. The effects of the present disclosure are not limited to the above-described contents. The components in each of the embodiments may be appropriately combined and applied. That is, various additions, modifications, and partial deletions can be made without departing from the conceptual idea and gist of the present disclosure derived from the contents defined in the claims and equivalents and the like thereof.

REFERENCE SIGNS LIST

1 Display device
100 Input/output I/F
102 Gamma generation circuit
104 Power supply
106 High-speed I/F
108 Control circuit
110 Vertical logic circuit
112 Vertical analog circuit
114 Horizontal logic circuit
116 Horizontal analog circuit
118 Pixel array
120 Pixel
130 CLK enabler
132 First latch
134 Second latch
136 Demultiplexer
138 Global counter
140 Comparator
142 SR latch
144 Level shifter
146 Ramp generator
148 Switch
150 Multiplexer
152 Level shifter
154 DAC
156 Amplifier
158 Demultiplexer

The invention claimed is:

1. A display device comprising:

a plurality of pixels arranged in a two-dimensional array in a first direction and a second direction intersecting the first direction;

a plurality of control lines extending in the first direction;

a plurality of data lines extending in the second direction;

a first circuit that supplies a control signal to the plurality of control lines; and a second circuit that supplies an image signal to the plurality of data lines, wherein the plurality of pixels includes a first subpixel that emits light of a first color, a second subpixel that emits light of a second color, and a third subpixel that emits light of a third color, the first subpixel, the second subpixel, and the third subpixel include:

a light emitting element;

a capacitor;

a write transistor that supplies the image signal supplied to a corresponding data line among the plurality of data lines, to the capacitor, on a basis of the control signal supplied to a corresponding control line among the plurality of control lines; and a drive transistor that supplies a drive current corresponding to voltage accumulated in the capacitor, to the light emitting element, and the second circuit supplies the same image signal to two data lines corresponding to two of the first subpixels provided in two pixels adjacent to each other in the first direction among the plurality of data lines, wherein the second circuit performs display by a binning process in the first direction and the second direction.

2. The display device according to claim 1, wherein the second circuit supplies the same image signal to the two data lines in an ith (i being an integer) horizontal period and an (i+n)th (n being an integer) horizontal period.

3. The display device according to claim 2, wherein the second circuit supplies the same image signal to the two data lines in the ith horizontal period and the (i+n)th horizontal period in different frames.

4. The display device according to claim 2, wherein every predetermined frame, the second circuit changes the two data lines to which the same image signal is supplied in the ith horizontal period and the (i+n)th horizontal period.

5. The display device according to claim 4, wherein in an (i+m)th (m being an integer that satisfies $m<n$) horizontal period and an (i+m+n)th horizontal period, the second circuit supplies the same image signal to the two data lines to which the same image signal is supplied in the ith horizontal period and the (i+n)th horizontal period.

6. The display device according to claim 4, wherein in an (i+m)th (m being an integer that satisfies $m<n$) horizontal period and an (i+m+n)th horizontal period, the second circuit supplies the same image signal to two data lines from which at least one of the two data lines to which the same image signal is supplied in the ith horizontal period and the (i+n)th horizontal period differs.

7. The display device according to claim 1, wherein the second circuit includes:

a first latch that stores the image signal;

a second latch that stores a signal supplied from the first latch, and outputs the stored signal on a basis of a synchronization signal in a horizontal direction; and a selector that multiplexes signals supplied from a plurality of the second latches, selects one of the multiplexed signals, and supplies the selected signal to the plurality of pixels.

8. The display device according to claim 1, wherein the pixel includes the subpixels that emit at least three primary colors of RGB, and, in the pixels adjacent to each other in the second direction, the second circuit causes the subpixels emitting R to emit light with a same intensity, and causes the subpixels emitting B to emit light with the same intensity.

9. The display device according to claim 8, wherein in the adjacent pixels that cause the subpixels emitting R and B to emit light with the same intensity, the second circuit causes the subpixels emitting G to emit light with the same intensity.

10. The display device according to claim 8, wherein in the adjacent pixels that cause the subpixels emitting R and B to emit light with the same intensity, the second circuit causes the subpixels emitting G to emit light with respective intensities based on the image signals for the respective pixels.

11. The display device according to claim 1, wherein the second circuit performs display by a doubler process in the first direction.

12. The display device according to claim 1, wherein the second circuit performs display by a doubler process in the first direction and the second direction.

13. An electronic apparatus comprising:

a first display device that displays an image to be visually recognized with one eye; and a second display device that displays an image to be visually recognized with another eye, each of the first display device and the second display device being the display device according to claim 1, wherein the image displayed on the first display device and the image displayed on the second display device are images having parallax for both eyes.

14. The electronic apparatus according to claim 13, wherein a combination of the two signal lines of the first display device is same as and a combination of the two signal lines of the second display device in a same frame.

15. The electronic apparatus according to claim 13, wherein a combination of the two signal lines of the first display device and a combination of the two signal lines of the second display device are different combinations in a same frame.

16. The electronic apparatus according to claim 13, wherein a first image is not displayed on the second display device at a time when any image is displayed on the first display device, and a second image is not displayed on the first display device at a time when any image is displayed on the second display device.

17. The electronic apparatus according to claim 13, wherein the first display device and the second display device have images not displayed in a same frame.

* * * * *